(12) United States Patent
Williams

(10) Patent No.: US 12,503,705 B2
(45) Date of Patent: Dec. 23, 2025

(54) CIRCULAR RNA PLATFORMS, USES THEREOF, AND THEIR MANUFACTURING PROCESSES FROM ENGINEERED DNA

(71) Applicants: Martin Williams, Buenos Aires (AR); SYTE.BIO INC., Chestnut Hill, MA (US)

(72) Inventor: Martin Williams, Buenos Aires (AR)

(73) Assignees: Martin Williams, Buenos Aires (AR); SYTE.BIO INC., Chestnut Hill, MA (US)

( * ) Notice: Subject to any disclaimer, the term of this patent is extended or adjusted under 35 U.S.C. 154(b) by 336 days.

(21) Appl. No.: 18/054,431

(22) Filed: Nov. 10, 2022

(65) Prior Publication Data

US 2023/0235337 A1     Jul. 27, 2023

Related U.S. Application Data

(60) Provisional application No. 63/279,801, filed on Nov. 16, 2021.

(51) Int. Cl.
*C12N 15/64*     (2006.01)
*C12N 9/22*     (2006.01)
*C12P 21/02*     (2006.01)

(52) U.S. Cl.
CPC ............... *C12N 15/64* (2013.01); *C12N 9/22* (2013.01); *C12P 21/02* (2013.01)

(58) Field of Classification Search
CPC .......... C12N 15/64; C12N 9/22; C12N 15/79; C12P 21/02
See application file for complete search history.

(56) References Cited

U.S. PATENT DOCUMENTS

2020/0080106 A1*    3/2020   Anderson ............ A61K 48/005

OTHER PUBLICATIONS

Puttaraju, M., & Been, M. (1992). Group I permuted intron-exon (PIE) sequences self-splice to produce circular exons. Nucleic Acids Research, 20(20), 5357-5364. https://doi.org/10.1093/nar/20.20.5357 (Year: 1992).*
Tolmachov, O. (2009). Designing plasmid vectors. Methods in Molecular Biology, 117-129. https://doi.org/10.1007/978-1-59745-561-9_6 (Year: 2009).*
PVIVO-MCS, pVITRO1-neo-MCS. InvivoGen. available as of 2012 per WayBack Machine (Year: 2012).*
Ford, T. (Feb. 18, 2016). Plasmids 101: Restriction cloning. https://blog.addgene.org/plasmids-101-restriction-cloning (Year: 2016).*

* cited by examiner

*Primary Examiner* — J. E. Angell
*Assistant Examiner* — Sarah E Allen
(74) *Attorney, Agent, or Firm* — D'Ambrosio & Menon, PLLC; Usha Menon

(57) ABSTRACT

The present invention relates to circular RNA platforms, their manufacturing processes from an engineered parental circular covalently closed synthetic plasmid DNA and, uses thereof. Novel engineered circular covalently closed plasmids comprising sequences capable of aiding in RNA circularization either autonomously or when processed with an engineered ligase are provided. The circular RNA platforms of the current invention have improved stability and increased half-life, display exceptional and stable protein production, while avoiding double-stranded intramolecular self-pairing RNA segments.

11 Claims, 16 Drawing Sheets
Specification includes a Sequence Listing.

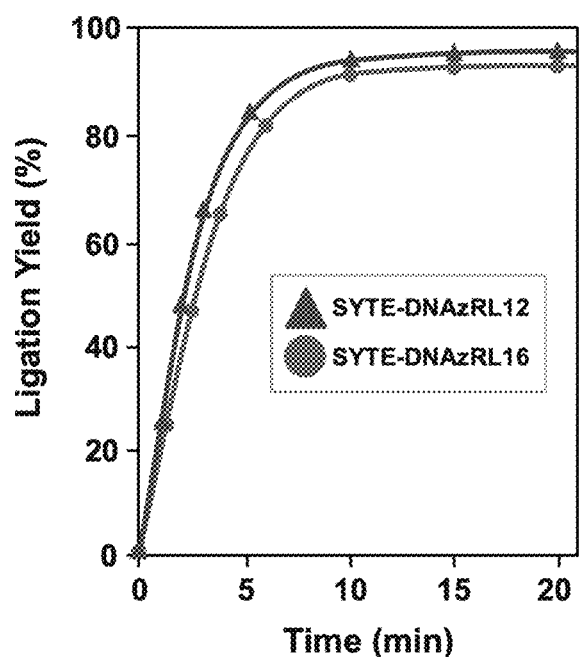
Figue 14
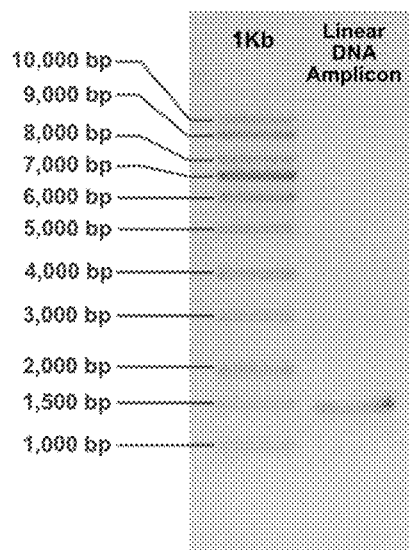
Figure 15

CIRCULAR RNA PLATFORMS, USES THEREOF, AND THEIR MANUFACTURING PROCESSES FROM ENGINEERED DNA

CROSS-REFERENCE TO RELATED APPLICATION

This application claims the benefit of Provisional U.S. Patent Application No. 63/279,801 filed Nov. 16, 2021, entitled "CIRCULAR RNA PLATFORMS, USES THEREOF, AND THEIR MANUFACTURING PROCESSES FROM ENGINEERED DNA," the entire content and disclosure of which, both express and implied, is incorporated herein by reference.

INCORPORATION BY REFERENCE

This application includes a sequence listing in computer readable form (a "xml" file) that is submitted herewith on an ST.26 XML file named Sequence_Listing.xml, created on Nov. 9, 2022 and 18,975 bytes in size. This sequence listing is incorporated by reference herein.

FIELD OF INVENTION

This invention relates generally to engineered DNA technology with the potential to produce circular RNA molecules, and, in particular, to processes for manufacturing circular RNA from engineered DNA, resulting circular RNA platforms capable of efficient translation inside eukaryotic cells, and their uses.

BACKGROUND OF THE INVENTION

Linear RNA

The concept of nucleic acid-encoded drugs was conceived over two decades ago when it was demonstrated that direct injection of in vitro transcribed (IVT) messenger RNA (mRNA) or plasmid DNA (pDNA) into the skeletal muscle of mice led to the expression of the encoded protein. At that time, mRNA-based drugs were not developed as mRNA is less stable than DNA, and thus, the field focused on DNA-based technologies. Nevertheless, mRNA has been subject of consistent research for several diseases since its discovery in 1961.

During the first decades after mRNA discovery, the main focus was on understanding the structural and functional aspects and metabolism of these molecules inside the eukaryotic cells. Also, over those decades, several tools created for mRNA engineering made these molecules more accessible to a broader research community. In the 1990's, preclinical exploration of mRNA molecules started and, consequently, this knowledge accumulated over the years, enabled recent scientific and technological advances to address and overcome some of the mRNA associated obstacles, such as its short half-life (it is a type of biological molecule subject to high levels of recycling or turnover) and unwanted immunogenicity.

Several important differences between IVT mRNA-based therapies and other nucleic acid-based therapies, such as pDNA, exist. IVT mRNA molecules do not need to enter the nucleus to function and once they reach the cytoplasm, these molecules are immediately translated. pDNA instead, must reach the nucleus to be transcribed into mRNA, which in turn must then be exported to the cytoplasm to be translated. Additionally, unlike pDNA and viral vectors, mRNA has no possibility of integrating into the host genome, thus avoiding the risk of insertional mutagenesis. It could only do so by non-canonical events mediated by the action of retrotranscriptases and integrases of transposable elements, sequences that, although abundant in eukaryotic genomes, are strongly silenced by different pathways, being this probability the same as that of any other cellular mRNA. For several medical and pharmaceutical applications, it is advantageous that IVT mRNA is only active for a short period of time (about a week) and then is completely degraded in a natural fashion. Further, IVT mRNA manufacturing is simple and inexpensive, and that is why IVT mRNA-based therapeutics have recently gained great interest.

IVT mRNA has undergone extensive preclinical and clinical research in cancer, infectious diseases, cardiology, endocrinology, and hematology within therapeutic as well as in preventive fields. The main concept behind IVT mRNA-based therapeutics is the transfer of a genetic coding sequence into the patient's cells, tissues or organs for preventing or altering a particular disease state.

There are two approaches to using IVT mRNA. One approach is to transfer the IVT mRNA into the patient's cells ex vivo (e.g., where cells had previously been extracted from the patient's body); and these transiently transfected cells are then re-administered to the patient. The other approach involves in-vivo administration of IVT-mRNA molecules into the patient's cells using diverse administration routes such as intramuscular injection, or intratumoral delivery. Both approaches are being used to treat and prevent several illnesses, such as infectious diseases, or treat genetic disorders, such as cancer.

Once the mRNA molecule is inside the cytoplasm, the encoded protein, which is the pharmacologically active product, is translated using the natural machinery of the transfected cell. IVT generated mRNA is engineered to resemble naturally occurring, mature, and processed endogenous mRNA molecules from eukaryotic cells. In consequence, the IVT mRNA is single-stranded, has a 5' cap, an open reading frame (ORF) flanked by start and stop codons and flanked as well by untranslated regions, and finally a 3' poly(A) tail. Introns are unwanted since these molecules will not pass through the nucleus, which is the subcellular compartment where splicing takes place.

These IVT mRNA molecules are synthesized in cell-free systems by an in vitro transcription reaction from a DNA template that can be a linearized plasmid or a linear PCR product. The DNA template encodes all the structural and functional elements except the 5' cap. The IVT can be performed with T7, SP6, T4 and T3 phage RNA polymerases in the presence of nucleotides and, after transcription, RNA is capped enzymatically with a capping enzyme such as the vaccinia capping enzyme. Then, the DNA template is subjected to DNase digestion and the resulting mRNA molecules are purified by methods well known in the art.

Pharmacodynamic activity of IVT mRNA is carried out in the cytoplasm. In contrast to endogenous mRNA that is produced in the nucleus and then enters the cytoplasm through nuclear exportation, IVT mRNA has to enter the cytoplasm from outside the cell.

IVT mRNA cytoplasmic bioavailability is limited by the rapid degradation by the highly active ubiquitous RNases that abound in the extracellular space, and the cell membrane, which hampers the entry of the negatively charged mRNA molecule into the cytoplasm. Eukaryotic cells are capable of actively engulfing naked mRNA molecules; however, in most cell types this uptake rate is minimal (less than 1 in 10 thousand molecules). Transfection of IVT mRNA molecules into patient's cells can be considerably improved by complexing them with polymers or lipid nanoparticles which protect the mRNA molecules from degradation by RNases and also help in the cellular uptake process. Alternatively, there are other techniques such as electroporation, that can be used for in vitro, in vivo, and ex vivo mRNA transfer into cells.

Once IVT mRNA is inside the cytoplasm, its pharmacology is governed by the same complex cellular mechanisms that regulate the stability and translation of endogenous mRNA. The translated polypeptide from the IVT mRNA can undergo post-translational modifications and then, the mature protein is considered a bioactive compound. IVT mRNA and protein product half-lives are critical determinants of the mRNA-based therapeutics pharmacokinetics.

Once the IVT mRNA encoded protein has been translated, its destination is determined by localization signals. These may be either natural or artificially introduced by genetic engineering to direct the polypeptide to the desired intracellular compartment, sent to a secretion pathway to act on neighboring cells or, if released into the bloodstream, to act on distant organs or tissues.

Processing pathways of IVT mRNA molecules for immunogenic approaches are crucial for its pharmacodynamics determination. Similar to the fate of endogenously generated proteins, IVT mRNA-encoded polypeptides are subjected to proteasomal degradation and presented in the context of a major histocompatibility complex (MHC) class I molecules to CD8+ T cells. In general, intracellular proteins do not get loaded onto MHC class II to induce T helper cell responses; however, by introducing a secretion signal into the antigen coding sequence, T helper cell responses can be achieved as the secretion signal redirects the protein into the extracellular space, and thus achieve MHC class II loading.

The IVT mRNA amount required for a preventive or therapeutic effect and the duration of the treatment depend on many factors which may vary for the different applications. For example, nanogram to microgram amounts of IVT mRNA may be sufficient for the efficient induction of an immune response in humans and non-human primates. In contrast, milligram or even gram amounts of proteins may be required for the delivery of systemically active growth factors, hormones, or monoclonal antibodies. Translational potency and intracellular stability of IVT mRNA can be optimized in order to achieve an increase in the amounts of protein per unit of mRNA.

Structural elements of IVT mRNA such as untranslated regions, 5' cap, open reading frame and poly(A) tail, have been modified in order to improve its intracellular stability and enhance the translational efficiency. These improvements lead to the production of significantly higher levels of the encoded protein over a longer timeframe, from a range of a few minutes to several days.

Robust translation of mRNA requires a functional 5' cap structure, and natural endogenous mRNA has a 7-methylguanosine (m7G) cap that is linked to the 5' end of the mRNA during the transcription process. Once mRNA is transcribed, mature, and located in the cytoplasm, translation initiation factor 4E (EIF4E) has to bind the 5' cap for an efficient translation. Decapping enzymes, such as DCP1, DCP2, or DCPS, regulate the mRNA decay. The most used approach to cap the IVT mRNA after the synthesis is to perform capping with vaccinia virus-derived capping enzymes where the resulting cap structure is identical to that of the endogenous eukaryotic cap.

Early research with mRNA was performed with m7GpppG cap analogues; however, a substantial m7GpppG cap analogue is incorporated in reverse orientation into the IVT mRNA and therefore not recognized by the translational machinery, resulting in lower translational activity. Anti-reverse cap analogues (ARCAs; m27,3'-GpppG) were developed and introduced to avoid the incorporation in reverse orientation, thus displaying superior translational efficiency in several cell types. Other ARCA cap analogues were developed such as phosphorothioate-containing ARCA, that confers resistance to DCP2 enzymes, hence extending the half-life. Although these strategies allow for more efficient capping, they substantially increase the cost of the overall process.

The poly(A) tail synergically with the 5' cap, internal ribosome entry site and other determinants regulates mRNA stability and translational efficiency. Poly(A) tail is encoded by the DNA template subjected to transcription or added by a recombinant poly(A) polymerase, and the latter method allows to add modified analogues such as cordycepin (3'-deoxyadenosine) thus inhibiting deadenylation by poly(A)-specific nucleases. Enzymatic polyadenylation is not preferred as in each RNA preparation there is a mixture of RNA species that differ in the poly(A) tail length. In contrast, IVT generated mRNA from a DNA template that has a defined poly(A) tail length, yields RNA species with the same poly(A) tail length. The optimal poly(A) tail length is between 120 and 150 nucleotides.

Other optimization strategies for enhancing the translation efficiency and the stability of IVT mRNA in cells exist, such as the incorporation of 5' and 3' UTRs containing regulatory sequences that modulate translation and stability, such as in endogenous mRNA. For example, many IVT generated therapeutic mRNA molecules have 3'-UTRs of α- and β-globin, and the stabilization effect of β-globin 3'-UTR sequences is further augmented by using two human β-globin 3'-UTRs arranged in head-to-tail orientation. In addition, several regions of endogenous and viral 5' and 3' UTRs enhance mRNA stability and translational efficiency. Elongation factor 1α (eEF1A) mRNA 3' UTR and orthopoxvirus mRNAs 5' UTR elements inhibit decapping and 3'-5' exonucleolytic degradation. However, destabilization of mRNA might as well be desired to limit the duration of protein expression. This effect can be achieved by the incorporation of AU-rich elements into the 3'UTRs, hence ensuring short duration of protein expression by rapid mRNA degradation.

Translation efficiency can be affected as well by codon composition. The replacement of rare codons with frequent codons, a process known as codon optimization, improves expression yields due to the reuse of the same tRNA, thus accelerating translation. Codon context (neighboring nucleotides and codons) also affects the translational efficiency and elongation rate. However, there are several valid reasons not to use optimized codons, the most important being that some proteins require low translation rates for their proper folding, which in turn is ensured by rare codons. Hence, it may be beneficial for IVT mRNA encoded vaccines to maintain the original open reading frame sequence. Potent T-cell epitopes may be generated when IVT mRNA is translated in different frames by ribosomal frame-shifting or when translation is initiated either internally or from a CUG start codon, and codon optimization eliminates these important sources of antigenic peptide variability.

The strong immune stimulatory effect and intrinsic adjuvant activity of IVT mRNA are added benefits for preventive vaccination, and leads to potent antigen-specific cellular and humoral immune responses. The type of immune response generated by these mRNA molecules depends on a range of factors, including the size of the nanoparticles formed with transfection molecules; however, activation of the innate immune response is a major disadvantage. Recent progress in identifying endogenous eukaryotic RNA sensors and the structural RNA elements involved in immune recognition provides opportunities to augment immune activation by IVT mRNA or, alternatively, to create mRNA molecules that do not activate the immune response.

IVT mRNA includes immune stimulation by activating pattern recognition receptors that naturally identify and respond to viral RNAs by inducing several downstream effects. Toll-like receptors TLR3, TLR7, and TLR8 inside the endosomal compartment are activated by endocytosed IVT mRNA in immune cells, and thus induce secretion of interferon. TLR3 recognizes double-stranded RNA (dsRNA), while TLR7 and TLR8 sense single-stranded RNA (ssRNA). Poly(U) is the most potent interferon inducer and acts through TLR7. In contrast, in non-immune cells, cytosolic receptors such as cytoplasmic retinoic acid-inducible gene I protein (RIG-I) and melanoma differentiation-associated protein 5 (MDA5) induce the expression of interferon. RIG-I is activated by short, double-stranded, 5' triphosphate RNA molecules while MDA5 responds to long dsRNAs and viral mRNA lacking 2'-O-methylation. Cytoplasmic RNA sensors mediate immune stimulation, affect mRNA translation efficiency and antiviral activity.

Protein kinase RNA-activated (PKR) phosphorilates the eukaryotic translation initiation factor 2α and inhibits global mRNA translation.

Non-immunogenic IVT mRNA can be created by the incorporation of naturally occurring modified nucleosides such as pseudouridine, 2-thiouridine, 5-methyluridine, 5-methylcytidine, or N6-methyladenosine. This approach has shown to suppress both the intrinsic adjuvant activity as well as inhibitory effects on translation.

Several cell types can spontaneously take up naked mRNA, which is internalized by scavenger-receptor-mediated endocytosis and accumulates in the lysosome, from which only small amounts of mRNA leak into the cytoplasm. In most cells, active uptake of mRNA is inefficient and saturated at low mRNA doses. Mainly two challenges associated with delivery of mRNA exist: i) to reach a high number of cells; and ii) to achieve high yields of encoded protein. Exogenous mRNA such as IVT mRNA can be delivered by transfection to several cell types such as muscle or subcutaneous cells, and several organs, such as the liver. Transfection can be performed using many types of polymer, liposomal delivery platforms and electroporation.

In vitro transfection strategies with IVT mRNA to obtain recombinant cells for adoptive transfer have been benefited from the development of pharmaceutical formulations that protect mRNA against RNase mediated degradation and facilitate its entry into the cells. Polymers such as polyethyleneimine or cationic polypeptides and dendrimers are commercially available and can be used to transfect cells with high efficiency. On the other hand, alternative methods such as electroporation, are also being established as a favored strategies for in vitro and in vivo transfection of several cell types such as haematopoietic ones.

Other in vivo transfection strategies such as naked mRNA or protamine-complexed mRNA vaccines are also used nowadays in several clinical trials; however, naked mRNA may not be sufficient to achieve high yields of protein expression in cell types other than dendritic cells.

Despite the efforts and developments previously described to improve intracellular stability and translational efficiency, alternatives to linear RNA have been found that further improve stability, duration of protein expression and, therefore, the amount of protein produced.

Circular RNA

Circular covalently closed RNAs (circRNAs) lack 5'-caps and 3'-poly(A) tails and they are highly stable when formulated in a pharmaceutical composition and when administered in vivo compared to their linear mRNA counterparts. These engineered circRNA molecules display improved amounts of protein expression and longer translational activity with diminished immunogenicity, thus leading to higher and more efficient protein production per dose. Additionally, these circular molecules exhibit smaller topological structures compared to the linear mRNA molecules and, therefore, they can be encapsulated in lipid nanoparticles or be complexed with various polymers in a more efficient and simple way.

Several sequence-dependent and cellular mechanisms exist that enable circularization of linear RNAs, giving place to a subclass of non-coding circular transcripts. Thousands of genes have been shown to express circular RNAs in a tissue- or cell-type-specific manner, even when they are regulated in developmental stages and pathophysiological conditions.

Functional RNA molecules not only involve transcripts encoding proteins. In fact, it is known that only 1-2% of the genome encodes for transcripts that are later translated into proteins. Most RNA molecules are actually non-coding transcripts which exert a broad range of regulatory functions within human cells. The first circular RNA molecules were observed in plant viroids around 1976 and, for a long time, they were considered to be transcriptional junk. However, around 2012, high-throughput transcriptome sequencing, bioinformatics, and focused molecular characterization of individual circRNAs uncovered their ubiquity and evidence emerged suggesting circRNAs are functional molecules; in fact, they have been described as a new class of non-coding RNAs. Today, more than 32,000 exonic circRNA have been annotated. They are dynamic, evolutionarily conserved and may be specific for certain cell types. Their circularization mechanism involves genes to transcribe covalently closed single-stranded RNAs by a process called backsplicing of linear precursor RNAs as, for example, the DCC tumor suppressor gene with "scrambled exons" joined at the end.

In nature, the process of RNA circularization is based on the mechanism of alternative splicing. Alternative splicing is a process that enables a mRNA to present different regulatory functions or direct synthesis of different protein variants (isoforms) that may have distinct cellular functions, localizations, or properties. For instance, genes expressing several circular transcripts exist, such as the TTN gene, which is well known to produce at least 38 different circRNAs. RNA circularization occurs by rearranging the pattern of intron and exon elements that are joined by splicing to alter the mRNA coding sequence. In other words, closed RNA loops are formed when an end of an exon (splice donor site) is joined to the end of the same exon (single-exon circRNA) or to that of an upstream exon (multiple-exon circRNA). In vivo circRNAs generated by splicing events can either be exonic or intronic, such as tRNA and rRNA introns produced from archaeal splicing. CircRNA molecules appear in several viruses, viroids and viroid-like satellites. In vitro circularization of RNA molecules involves an intramolecular formation of 3'-5' phosphodiester bond, requiring the 3' and 5' ends in the linear RNA precursor to be proximal.

There is a correlation between longer linear genes and a high number of circRNA isoforms. For example, exon 2 of the gene locus is particularly often present in circRNAs.

Several circRNAs contain more than one exon and sometimes they can harbor around 100 exons within the back splice site, and their sizes vary from 100 bases up to several kilobases. Most circRNAs are generated from the linear counterparts and are derived from constitutive exons. They often contain GT/AG canonical splice motifs suggesting that a canonical spliceosome is involved, and are mostly formed after transcription, although a few cases have been shown to happen co-transcriptionally. RNA-binding proteins such as RBP Quaking (QKI) and RBP Muscleblind (MBL) help in the formation of different circRNAs by facilitating the hybridization of flanking introns. Whereas the former has been shown to act on transcripts from different gene locus, the latter circularizes transcripts from gene locus circMbl. Other examples for regulating circRNAs cellular titers are known. One of such examples is the RNA-editing enzyme ADAR (adenosine deaminase acting on RNA), known not only for mediating the A-to-I substitution in RNA processing, but also for down-regulating different circRNA titers when it is highly expressed. The RNA helicase DHX9 (DExH-Box Helicase9), which binds double-stranded RNA (dsRNA), is another example as it has been shown to be involved in the formation of many circRNAs and to interact with the ADAR p150 isoform.

Synthetic biology can be used to create novel circRNA molecules that are able to encode proteins of interest with therapeutic effects.

CircRNAs are highly stable molecules because they are protected against degradation by the ubiquitously spread exonucleases. Synthetic biology can be used to create novel circRNA molecules that are able to encode proteins of interest with therapeutic effects. The covalently closed circRNA molecules might also be beneficial for applications such as the production of antisense-RNAs, aptamers, ribozymes or siRNAs.

RNA In Vivo Circularization

Formation of Exonic circRNAs

Spliceosomes act to remove introns from primary transcripts in eukaryotic cells by a two-step mechanism. In the first step, the 2'—OH group of a defined adenosine within the intron (denoted as branch point adenosine) attacks the 5'-splice site, thus generating a free 3'—OH group at the 5'-exon and the lariat intermediate. The second step involves the nucleophilic attack of the generated 3'—OH group onto the 3'-splice site, producing an excised lariat intron and a linear RNA composed of the two combined exons. Exonic circRNAs may result from splicing. After circRNAs were first observed in 1991, thousands of endogenous circRNAs have been identified in mammalian cells, which are abundant and evolutionary conserved.

Direct back-splicing was termed 'mis-splicing' due to exon scrambling or shuffling, where exons are spliced in a non-canonical way; nonetheless, as circRNAs may be generated by purpose rather than resulting from mis-splicing events, the proper term should be 'back-splicing'. Direct back-splicing involves joining the 3'-tail of a downstream exon to the 5'-head of the same exon, or of an exon normally located upstream. The downstream splice donor pairs with an unspliced upstream splice acceptor and, as a result, the exon becomes circularized.

Another mechanism involves the creation of a lariat that contains an exon produced from exon skipping, that subsequently undergoes internal splicing, thereby removing the intron and generating a circRNA. Both mechanisms can be performed in vivo.

Recent findings demonstrate that flanking intronic sequences are needed for exon circularization. Furthermore, it was demonstrated that linear splicing and circularization compete against each other.

Several DNA vectors which include the desired exon to be circularized and partial sequences of the flanking introns have been designed in order to produce circRNAs in vivo.

Formation of Intronic circRNAs

Self-splicing introns belonging to group II generate a branched lariat intermediate and a lariat intron, and there is evidence that these are excised as RNA circles although circularization occurs through the formation of a 2', 5'-phosphodiester bond. Circle formation requires prior release of the 3' exon, for example by using a trans-splicing mechanism. The intron's terminal 2'—OH group attacks the 5'-exon intron junction (5'-splice site), generating the circularized intron and the 5'-exon.

In contrast, group I introns self-splice by first recruiting a guanosine (exoG) as an external nucleophile that initiates splicing by nucleophilic attack on the 5'-splice site and then becomes linked to the 5'-end of the intron.

In the second transesterification, the exons are ligated and thus a linear catalytic intron is released, and the excised linear intron can be circularized by a nucleophilic attack of the 3'-terminal guanosine on a phosphodiester bond near the 5'-end of the intron. The 5'-terminal sequence is released and the intron is circularized. The pairing of the three nucleotides preceding the cleaved phosphate define the phosphate to be attacked in the circularization and, as a result, a variety of truncated intron-based circles that have short half-lives are produced. Full-length intron circles formation is a general feature of all types of introns belonging to group I.

RNA In Vitro Circularization

The demand for methods that allow efficient in vitro generation of circRNAs for structural and functional analysis have caused the development of chemical and enzymatic tools for RNA circularization.

Chemical Method

Chemical ligation of nucleic acid strands can be achieved by using cyanogen bromide (BrCN) together with morpholino derivatives such as 2-(N-morpholino)-ethane sulfonic acid (MES) for linking two RNA strands that carry terminal 5'-hydroxyl and 3'-phosphate groups. There are other chemicals that support phosphodiester bond formation; however, BrCN is the most used reagent. Chemical ligation typically involves the use of an oligonucleotide splint that interacts with the two termini and thus aids in circularization. Intermolecular ligation is a highly competitive reaction, but can be suppressed by working with small concentrations of the nucleic acid to be circularized, so as to favor intracatenary ligation. The formation of 2'-5' phosphodiester bonds instead of the natural 3'-5' phosphodiester bonds is even a more serious side reaction associated with chemical ligation of RNA strands that can be avoided by using oligonucleotides with a 2'-deoxy sugar moiety at the 3'-end.

In the last decade of the past century, a solid phase synthesis of circRNAs of 2-21 nucleotides in length based on phosphoramidite chemistry was developed, but as no more than 21 nucleotides can be joined, this method was not further used for RNA circularization.

Enzymatic Methods

Several enzymatic ligations of synthetic nucleic acids have been developed. Different naturally occurring ligases are capable of ligating nicks in single- and double-stranded nucleic acids, all of which are encoded in the T4 bacteriophage genome. These ligases catalyze the formation of a phosphodiester bond between 5'-phosphate (donor) and 3'-hydroxyl (acceptor) end groups in DNA or RNA in an ATP-dependent reaction.

The 5'-end of the linear precursor must be phosphorylated independent of the chosen chemical or enzymatic method for a correct circularization. If IVT RNA is prepared, the 5'-triphosphate end must be removed by a polynucleotide kinase. In order to obtain a 5' monophosphorylated linear RNA substrate, GMP-primed IVT using T7 RNA polymerase can be employed. These methods are chosen for RNAs with less than 500 nucleotides; on the other hand, if large substrates need to be circularized, the PIE (Permuted Intron-Exon) strategy may be a better alternative than the splint ligation method.

If T4 ligase is the chosen method, the ligation site must be located within a double-stranded region because single-stranded regions are not ligated. For that reason, an oligo-nucleotide splint can be used to obtain a double-stranded segment around the ligation site, thus ensuring the approach of the free ends. For an efficient ligation reaction, splint length, stoichiometry and temperature conditions must be adjusted.

Other T4 ligases can be used to achieve the ligation of nucleic acids, for example, T4 RNA ligase 1 that assists in the formation of 3'-5' phosphodiester bonds in single-stranded RNA molecules. However, a big limitation is that intermolecular ligation greatly competes with circularization. T4 RNA ligase 1 has several preferences for donor and acceptor nucleotides at the ligation site: A>G≥C>U for the 3'-end nucleotide acceptor, and pC>pU>pA>pG for the 5'-end nucleotide donor. This ligase has been used for circularization of short and long RNA molecules. Non-coding RNAs, such as hammerhead ribozymes, have been efficiently synthesized from linear oligonucleotides using this ligase.

T4 RNA ligase 2 has inter- and intramolecular ligation activity; however, when compared to T4 RNA ligase 1, the latter is way more efficient in joining nicks in double-stranded RNA substrates.

Apart from these three well-known T4 RNA ligases, there are other ligases capable of performing RNA circularization, for example, tRNA ligases from wheat germ, and ligase from *Saccharomyces cerevisiae*. Another ligase (Pap1020) was found in *Pyrococcus abyssi*, and this one performs ATP-dependent circularization of oligonucleotides in vitro.

Viroids and other small infectious RNAs use the double rolling-circle reaction to replicate, and this method can be used with the self-splicing activity of the hairpin ribozyme to generate in vitro circRNAs.

In contrast to the chemical and enzymatic ligation methods, group I self-splicing intron system known as PIE (Permuted Intron-Exon) allows the formation of circRNA molecules in vitro and in vivo. There are several group I intron precursor RNAs derived from organisms such as *Tetrahymena* spp or *Anabaena* spp, and viruses such as T4 phage, that contain end-to-end fused exons that interrupt half-intron sequences that in turn self-splice to generate a circular RNA exon in vitro. Exon sequences can be replaced by foreign sequences from a group I intron self-splicing system to make desired circular sequences, and that is possible because exon sequences are not involved in the self-splicing reaction. The Permuted Intron-Exon method includes two transesterifications at defined splice sites and, after the splicing, the ends are ligated forming circular RNA molecules. More specifically, the first transesterification releases the 3'-end sequence (5'-half intron) of the sequence. Subsequently, the free 3'OH group of the 3'-half exon attacks the 3'-splice site during the second transesterification, generating circRNA molecules. This method has been used to generate RNA aptamers, hammerhead ribozymes, and hepatitis delta ribozymes.

Group II introns can be modified for inverted splicing, thus generating circRNA molecules. Yeast self-splicing group II intron can catalyze the formation of circular RNA molecules. This method requires the rearrangement of the exons in a consecutive way, where the branch point has to be positioned upstream and the intronic sequences flanking the exons. This method allows the circularization of the molecules by two transesterification reactions. This group II method is way more efficient than the group I intron method; however, this approach carries out the formation of a 2'-5' phosphodiester bond at the ligation site.

In conclusion, there are two main methods of choice for circRNA manufacturing, namely 1) chemical methods (with reagents such as cyanogen bromide), and 2) enzymatic methods that involve the use of ligases taken from several organisms or viruses such as T4 ligase, or the Permuted Intron-Exon method (PIE). However, all these techniques share the disadvantage of yielding low amounts of circRNA molecules and the presence of side products. Furthermore, chemical methods rely on in vitro chemical reactions producing circRNAs with non-physiological ligation sites and protective groups that have to be further removed after the circularization reaction. Additionally, these methods are not efficient when larger sized RNA molecules are involved, thus limiting their therapeutic applications. Furthermore, methodologies described by other companies rely on the circularization of RNA molecules using the PIE method that uses complementary sequences that stay in the covalently closed cricRNA molecules after the splicing event, thus forming stable double-stranded stem RNA segments that might activate an undesired immune response, down-regulating the expression of the encoded protein.

None of the existing solutions is capable of providing a high yield circular RNA manufacturing system and process having improved stability and increased half-life, while at the same time involving no double-stranded intramolecular stem RNA segments that may interfere with the above objectives. Therefore, approaches for optimizing circularization of RNA are needed.

SUMMARY

The present disclosure provides, in a first aspect, an engineered parental circular covalently closed synthetic plasmid DNA (SEQ ID NO 1; FIG. 1) comprising: a synthetic DNA backbone comprising at least two endonuclease recognition sequences, at least one bacterial selection system, and at least one bacterial origin of replication (FIG. 2), and; a circular RNA module scaffold comprising at least one RNA polymerase promoter, at least two circularization sequences (cirSEQ1 and circSEQ2; see below), at least two DNA spacers, at least one translation initiation sequence, at least four restriction enzyme recognition sequences, at least three multiple cloning sites and at least one coding sequence (FIG. 3).

In a second aspect of the present invention, the first circularization sequence (circSEQ1) is comprised of at least a first restriction enzyme recognition sequence (RE1A), a first homology region (HR1B) operably linked to a an exon segment (Exon I) and intron segment (Intron I) derived from permuted self-splicing and auto-catalytic group I intron-exon systems, a second restriction enzyme recognition sequence (RE1B) and a second homology region (HR1A) (FIG. 4).

In a third aspect of the present invention, the second circularization sequence (circSEQ2) is comprised by at least a first homology region (HR2B) operably linked to a first restriction enzyme recognition sequence (RE2A), an exon segment (Exon II) and intron segment (Intron II) derived from permuted self-splicing and auto-catalytic group I intron-exon systems, a second homology region (HR2A) and a second restriction enzyme recognition sequence (RE2B) (FIG. 5).

In a fourth aspect of the present invention, the first homology region HR1A of the first circularization sequence circSEQ1 is complementary to the second homology region HR2A of the second circularization sequence circSEQ2 (FIG. 6).

In a fifth aspect of the present invention, the second homology region HR1B of the first circularization sequence circSEQ1 is complementary to the first homology region HR2B of the second circularization sequence circSEQ2 (FIG. 6)

In a sixth aspect of the present invention, we describe a process for manufacturing circular RNA comprising at least the following steps:
a. transforming the engineered parental circular covalently closed synthetic plasmid DNA of the present invention into a suitable bacteria strain, and selecting the recombinant clones by means of the bacterial selection system comprised in said parental plasmid;
b. subjecting the resulting recombinant bacteria to incubation in growth conditions to allow the replication of the engineered parental circular covalently closed synthetic plasmid DNA in order to generate a suitable mass of molecules;
c. isolating and purifying the resulting engineered parental circular covalently closed synthetic plasmid DNA molecules;
d. selecting a suitable ligation system from the group consisting of RNA ligating DNAzymes, CRISPR/dCas9-DNA Ligase, and Intron-Exon Mediated Ligation;
e. digesting the purified engineered parental circular covalently closed synthetic plasmid DNA with suitable restriction enzymes;
f. purifying the linearized circular RNA module scaffold of the engineered parental circular covalently closed synthetic plasmid DNA;
g. subjecting the purified linearized circular RNA module scaffold to an In Vitro Transcription reaction in order to generate linear RNA molecules;
h. subjecting the linear RNA molecules to the selected suitable circularization method; and,
i. purifying the resulting circular RNA, According to a seventh aspect of the invention, a first circular RNA manufacturing process is provided, comprising:
the engineered parental circular covalently closed synthetic plasmid DNA of the present invention (FIG. 1); and,
a RNA ligating DNAzyme.

In a further aspect of the invention, when the selected ligation system in step d of the process for manufacturing circular RNA is an RNA-ligating DNAzyme, said DNAzyme comprises at least the following three sections to support the ligation reaction for the circularization of the linear RNA (FIG. 7).

a first section, being a complementary region that targets the 5' free end of the target RNA to be ligated (DNAzHR2A; SEQ ID NO 4);
a second section, being a core, which is a portion of the DNAzyme with the ability to offer a stable stereospatial structure that creates the ideal environment for RNA to be ligated, wherein such core consists of nucleotides with a synergy within their combination that enables the hybridization of two RNA substrates via Watson-Crick base pairing; and,
a third section, being a complementary region that targets the 3' free end of the target RNA to be ligated (DNAzHR1B; SEQ ID NO 3).

According to an eighth aspect of the invention, a second circular RNA manufacturing process is provided, comprising:
the engineered parental circular covalently closed synthetic plasmid DNA of the present invention (FIG. 1); and,
a fusion protein comprising the dCas9 fused to a DNA ligase by a peptidic linker, in complex with a synthetic gRNA complementary to HR1A and HR2B.

In a further aspect of the invention, when the selected ligation system in step d of the process for manufacturing circular RNA is a CRISPR/dCas9-DNA Ligase system, the synthetic fusion protein comprising the dCas9 fused to a DNA ligase by a peptidic linker, in complex with a synthetic gRNA homologous to circSEQ-HR1A and circSEQ-HR2B providing targeting for the ligase activity to join the ends and thus circularize the linear RNA molecules is used (FIG. 8).

According to a ninth aspect of the invention, a third circular RNA manufacturing process is provided, comprising:
the engineered parental circular covalently closed synthetic plasmid DNA of the present invention with full circSEQ1 and circSEQ2 sequences and a suitable buffer (FIG. 1).

Said third circular RNA manufacturing process can be used to produce circRNA molecules by means of a self-splicing process involving the intact sequences depicted in circSEQ1 (FIG. 4) and circSEQ2 (FIG. 5).

A further aspect of the current invention is any circular RNA platform (circRNA) manufactured by any of the novel processes provided above or their combinations.

BRIEF DESCRIPTION OF DRAWINGS

The invention is further described in the Detailed Description with reference to the accompanying drawings.

FIG. 14 is a graph representing the RNA ligation yield versus time when using DNAzyme for circularizing RNA according to embodiments of the present invention.

FIG. 15 is an analytical agarose gel electrophoresis showing the linearized plasmid DNA template generated by PCR. The image shows the linear pSYTEcRNA-TurboGFP PCR product.

Figure 1:
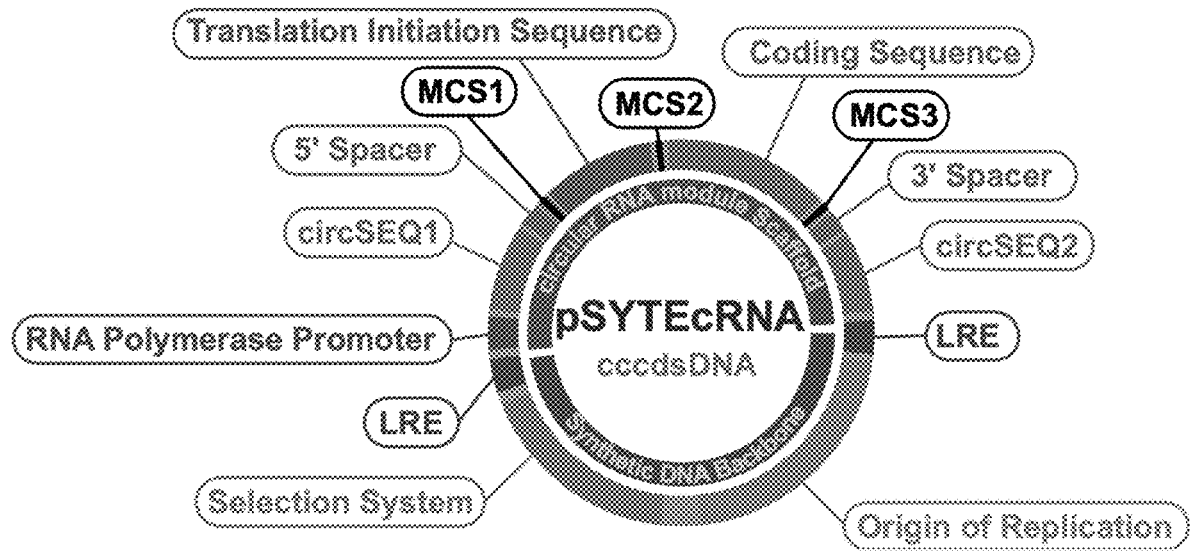
FIG. 1 is a schematic representation of an exemplary embodiment of the engineered parental plasmid DNA pSYTEcRNA in accordance with the present invention.

Although the exemplary embodiments described herein are susceptible to various modifications and alternative forms, specific embodiments are shown by way of example in the drawings and will be described in detail below. However, the exemplary embodiments described herein are not intended to be limited to the particular forms disclosed.

DETAILED DESCRIPTION OF THE INVENTION

The general operating characteristics and advantages of the present invention will now be described in greater detail in this section in connection with the preferred embodiments, which should be considered as exemplary only and not limiting of the present invention.

As described herein, new engineered circular RNA (circRNA) platforms, their manufacturing processes, and uses thereof were developed. The circRNA molecules described herein are generated by circularization of in vitro transcribed linear RNA molecules derived from an engineered parental plasmid DNA vector which harbors all the necessary sequences. These circRNA molecules are polyribonucleotides that form a continuous circular structure through covalent bonds and can harbor non-coding and coding sequences that can be translated inside prokaryotic and eukaryotic cells.

Due to their circular topology, circRNAs have improved stability, increased half-life, reduced unwanted immunogenicity, higher protein expression yields and improved functionality compared to their linear RNA counterparts.

Figure 17:
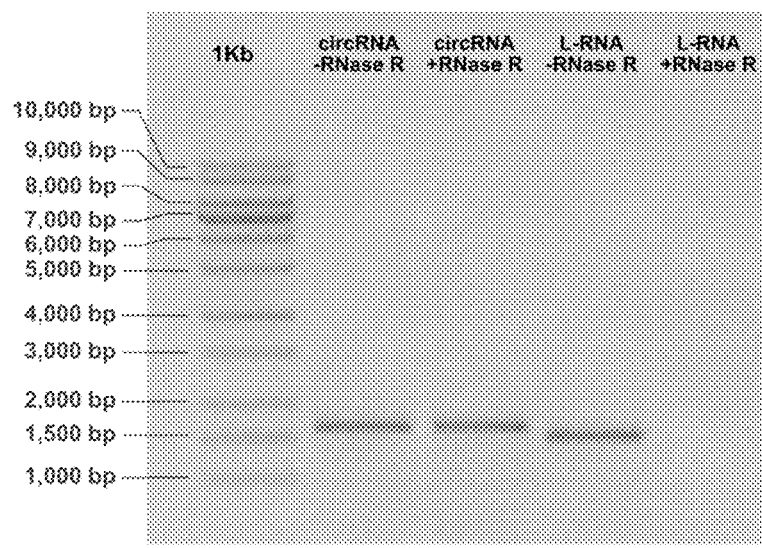
FIG. 17 is an analytical agarose gel electrophoresis confirming the presence of circRNA molecules generated with DNAzyme Mediated RNA Circularization after treatment with RNAse R.
Figure 18:
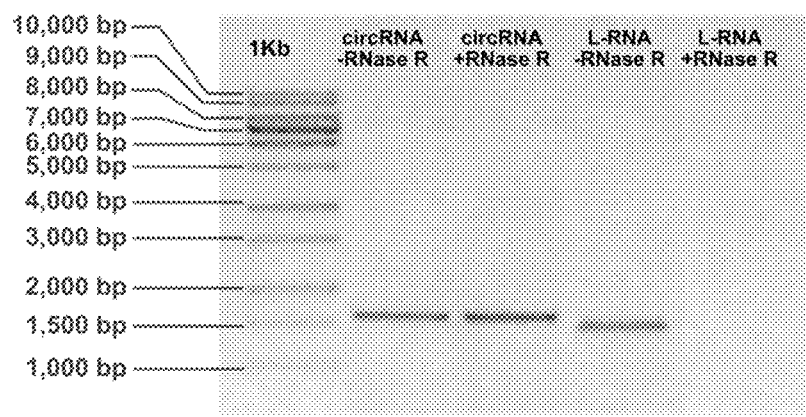
FIG. 18 is an analytical agarose gel electrophoresis confirming the presence of circRNA molecules generated with CRISPR/dCas9-DNALigase Mediated RNA Circularization after treatment with RNAse R.
Figure 19:
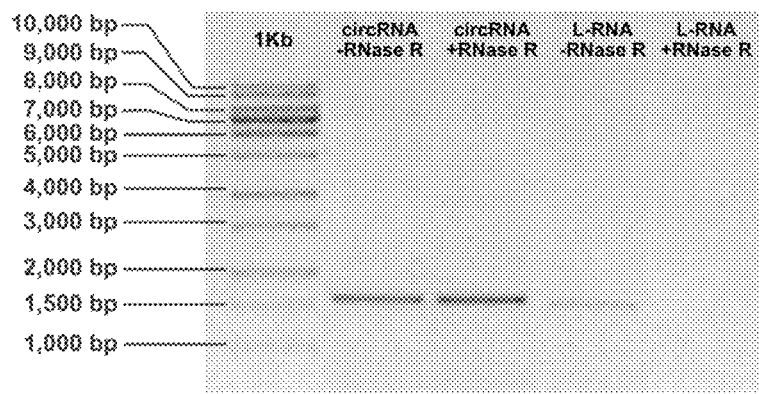
FIG. 19 is an analytical agarose gel electrophoresis confirming the presence of circRNA molecules generated by Self-Complementary Intron-Exon Mediated Ligation RNA circularization.

As a result of their circularization, circRNAs include several characteristics that make them very attractive for their use as therapeutics. For example, the circular covalently closed polyribonucleotide is significantly less susceptible to degradation mediated by exonucleases as compared to linear RNA molecules, thus being more stable in pharmaceutical compositions and in the extracellular space where ubiquitous exonucleases are present. Improved stability has been proved by incubating the circRNA molecules with exonucleases, and no degradation has been observed, as shown in FIGS. 17-19. Additionally, circRNA molecules have been stored at room temperature in tap water and no degradation occurred.

In some embodiments, the circular covalently closed RNA molecules are transcribed from a parental circular covalently closed deoxyribonucleic acid plasmid that can be non-naturally occurring and that can be produced by recombinant DNA technology, and chemical or enzymatic synthesis.

Furthermore, the deoxyribonucleic acid molecule used to produce the circular covalently closed RNA can comprise genetic sequences of naturally occurring nucleic acid sequences, modified versions not normally found in nature, or combinations thereof (e.g., chimeric molecules, fusion proteins or de novo generated). Deoxyribonucleic acid molecules can be modified using a wide variety of techniques including, but not limited to, site-directed mutagenesis, chemical induced mutations, restriction enzyme cleavage of a nucleic acid fragment of interest, ligation of nucleic acid fragments, polymerase chain reaction (PCR) mutagenesis, amplification, ligation of genetic sequences of interest, chemical synthesis, or enzymatic synthesis.

Circular RNA molecules can be generated by circularization of linear RNA molecules by any of the novel methods described below. The formed phosphodiester linkage can be an intramolecular linkage or an intermolecular linkage thus generating fully functional concatemers.

Figure 2:
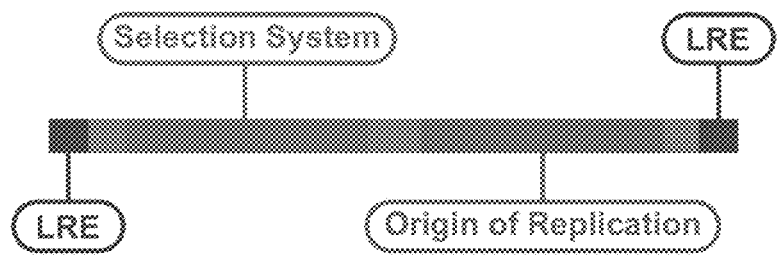
FIG. 2 is a schematic representation of the synthetic DNA backbone of pSYTEcRNA.
Figure 3:
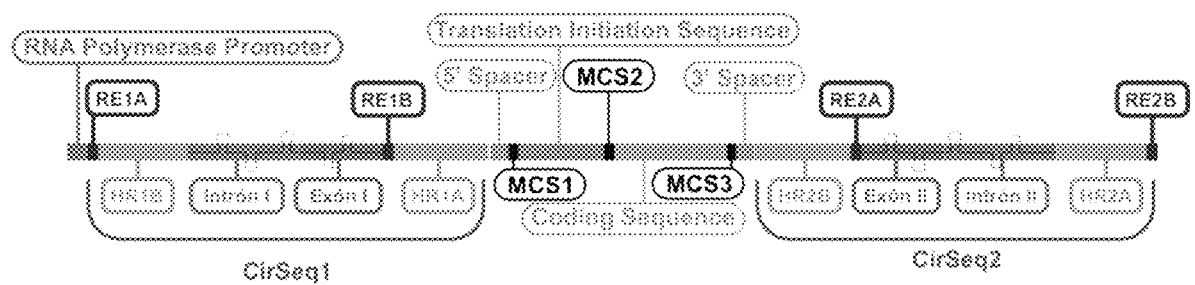
FIG. 3 is a schematic representation of the circular RNA module scaffold of pSYTEcRNA.

According to a first aspect of the present invention, an engineered circular covalently closed synthetic plasmid DNA is provided (FIG. 1) comprising:
 a synthetic DNA backbone comprising at least two endonuclease recognition sequences (denoted as LRE, Linearization Restriction Enzyme), at least one bacterial selection system, and at least one bacterial origin of replication (FIG. 2), and;
 at least one circular RNA module scaffold comprising, in the following order, at least one RNA polymerase promoter, at least a first circularization sequence (circSEQ1), at least one 5' DNA spacer, at least a first multiple restriction enzyme recognition sequence (MCS1), at least one translation initiation sequence, at least a second multiple restriction enzyme recognition sequence (MCS2), at least one coding sequence, at least a third multiple restriction enzyme recognition sequence (MCS3), and at least one 3' DNA spacer (FIG. 3). Said circularization sequences comprise homology region nucleic acid sequences complementary to a nucleic acid and/or protein-based system capable of RNA ligation, said system being selected from the group consisting of RNA ligating DNAzymes, CRISPR/dCas9-DNALigase and Intron-Exon Mediated Ligation.

The Translation Initiation Sequence (e.g., IRES) and Coding Sequence of Interest are flanked by non-coding spacers and further flanked by circularization sequences denoted as circSEQ1 at 5' and circSEQ2 at 3'. Further, an RNA promoter is located upstream of the circSEQ1 as depicted in FIG. 3. Unique restriction enzyme recognition sites (LRE Linearization Restriction Enzyme) are located upstream the RNA promoter sequence and after the circSEQ2 sequence, allowing linearization of the DNA vector prior to the in vitro transcription reaction. The engineered plasmid harbors a synthetic DNA backbone comprising a selection system and a bacterial origin of replication.

In some embodiments the bacterial origin of replication can be selected from, but not limited to, pMB1 origin, pMB1* derivative origin, pBR322 origin, ColE1 origin, ColE1* derivative origin and F1 origin. Preferably, the bacterial origin of replication comprises the pMB1* derivative, high copy number origin of replication.

In some embodiments, the bacterial selection system comprises a transcriptional unit capable of expressing antibiotic resistance genes inside a bacterium. As an example, the antibiotic resistance genes can be selected from, but not limited to, ampicillin resistance gene, kanamycin resistance gene, chloramphenicol resistance gene, gentamicin resistance gene, spectinomycin resistance gene, streptomycin resistance gene, carbenicillin resistance gene, bleomycin resistance gene, erythromycin resistance gene, tetracycline resistance gene and polymyxin B resistance gene. In a preferred embodiment, the antibiotic resistance gene is an ampicillin resistance gene.

The parental circular covalently closed synthetic plasmid DNA described herein was designed so as to allow for three different manufacturing processes: DNAzyme-mediated RNA circularization, CRISPR-dCas9-Ligase-mediated RNA circularization and Self-splicing-mediated RNA circularization, to be applied for the manufacturing of circular RNA molecules. To that end, circularization sequences circSEQ1 (FIG. 4) and circSEQ2 (FIG. 5) were designed to bear all the necessary sequences required for circularization by any of the three manufacturing processes.

Figure 7:
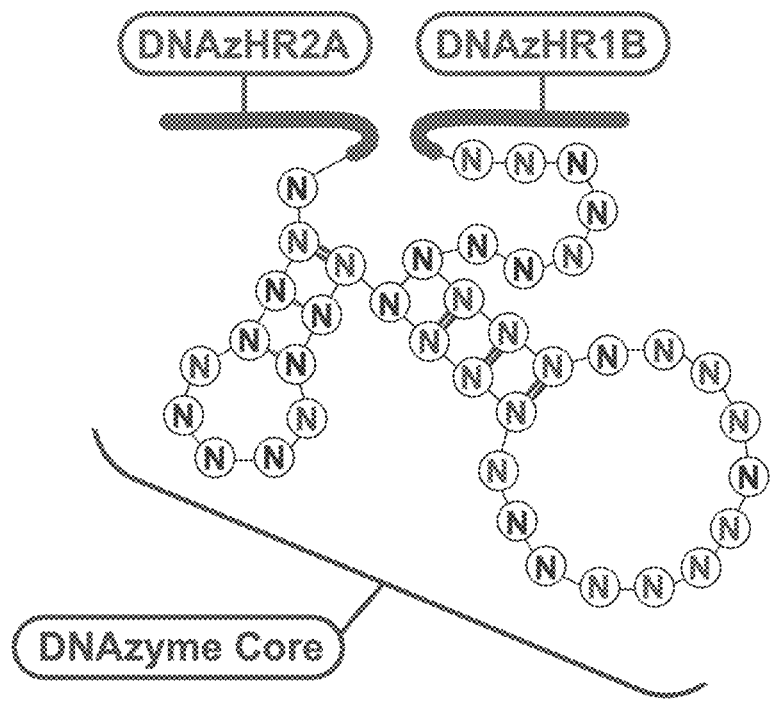
FIG. 7 is a schematic representation of the SYTE-DNAzRL16 DNAzyme, including its genetic sequence, in accordance with some embodiments of the present invention.
Figure 8:
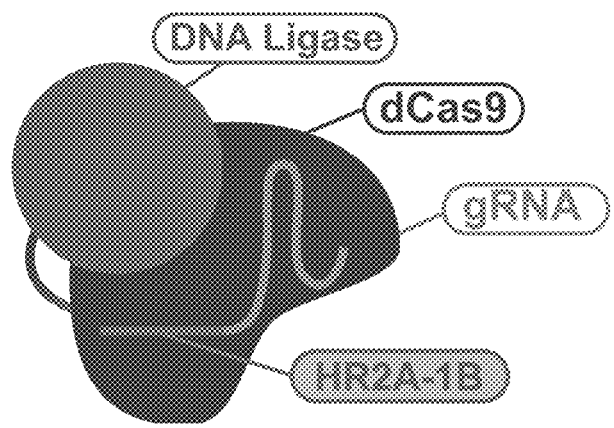
FIG. 8 is a schematic representation of the CRISPR/dCas9-DNA ligase chimera in association with the engineered gRNA complementary to the HR1A and HR2B regions of the linear RNA module scaffold.

The DNAzyme-mediated and the CRISPR-dCas9-Ligase-mediated manufacturing processes both require that the exons and introns involved in the third process (Self-splicing-mediated circularization) and some of the homology regions be removed from the circSEQ1 and circSEQ2 before the in vitro transcription reaction takes place. This "circSEQ's trimming" leaves only the homology regions HR1A and HR2B as the 5'-most and 3'-most regions of the in vitro transcribed linear RNA molecule, respectively. These regions thus serve as anchoring sequences to be bound either by the DNAzyme Homology Regions DNAzHR2A and DNAzHR1B (FIG. 7) or by the gRNA (HR2A-1B) loaded into the CRISPR-dCas9-DNA Ligase chimera (FIG. 8).

Figure 4:
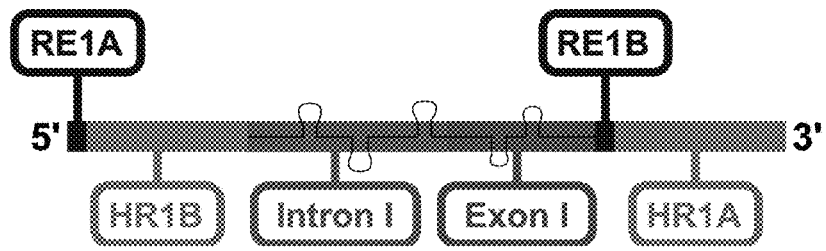
FIG. 4 is a schematic representation of the circSEQ1 sequence of pSYTEcRNA

In a second aspect of the present invention, the first circularization sequence (circSEQ1) is comprised of at least a first restriction enzyme recognition sequence (RE1A), a first homology region (HR1B) operably linked to an exon segment (Exon I) and intron segment (Intron I) derived from permuted self-splicing and auto-catalytic group I intron-exon systems, a second restriction enzyme recognition sequence (RE1B) and a second homology region (HR1A) (FIG. 4).

Figure 5:
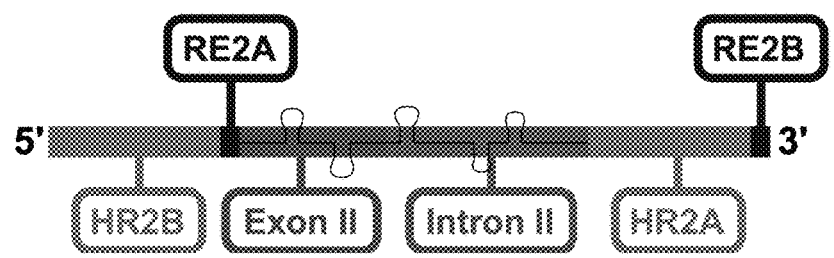
FIG. 5 is a schematic representation of the circSEQ2 sequence of pSYTEcRNA

In a third aspect of the present invention, the second circularization sequence (circSEQ2) is comprised of at least a first homology region (HR2B) operably linked to a first restriction enzyme recognition sequence (RE2A), an exon segment (Exon II) and intron segment (Intron II) derived from permuted self-splicing and auto-catalytic group I intron-exon systems, a second homology region (HR2A) and a second restriction enzyme recognition sequence (RE2B) (FIG. 5).

Figure 6:
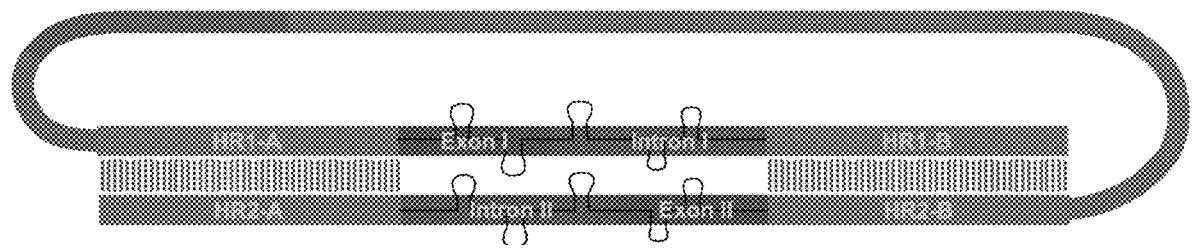
FIG. 6 is a detailed representation of the self-annealing of HR regions (HR1A/HR2A and HR1B/HR2B) in the linear IVT generated RNA molecule, according to some embodiments of the present invention. It also details the Self-Splicing Intron-Exon orientation.

In a fourth aspect of the present invention, the first homology region HR1A of the first circularization sequence circSEQ1 is complementary to the second homology region HR2A of the second circularization sequence circSEQ2 (FIG. 6).

In a fifth aspect of the present invention, the second homology region HR1B of the first circularization sequence circSEQ1 is complementary to the first homology region HR2B of the second circularization sequence circSEQ2 (FIG. 6)

In some embodiments, circSEQ1 HR1A sequence is composed of at least 10 random nucleotides that can be selected from adenine, thymine, guanine, and cytosine. In a preferred embodiment, the sequence is SEQ ID NO 2.

In some embodiments, circSEQ1 HR1B sequence is composed of at least 10 random nucleotides that can be selected from adenine, thymine, guanine, and cytosine. In a preferred embodiment, the sequence is SEQ ID NO 3.

In some embodiments, circSEQ2 HR2A sequence is composed of at least 10 random nucleotides that can be selected from adenine, thymine, guanine, and cytosine. In a preferred embodiment, the sequence is SEQ ID NO 4.

In some embodiments, circSEQ2 HR2B sequence is composed of at least 10 random nucleotides that can be selected from adenine, thymine, guanine, and cytosine. In a preferred embodiment, the sequence is SEQ ID NO 5.

In some embodiments, the RNA polymerase promoter may be viral, and selected from, but not limited to, T7 RNA polymerase promoter, SP6 RNA polymerase promoter, T3 RNA polymerase promoter, T6 RNA polymerase promoter, T4 RNA polymerase promoter, and K11 RNA polymerase promoter. In a preferred embodiment, the selected viral RNA polymerase promoter is T7 RNA polymerase promoter.

An internal ribosome entry site (IRES) genetic element comprises any RNA sequence capable of binding a eukaryotic ribosome and promoting translation initiation. IRES are described in more detail below, referring to non-limiting examples thereof.

The coding sequence refers to a polynucleotide sequence which codes for a specific amino acid sequence. Preferred coding sequences are described in more detail below.

As used herein, the term "spacer" or "spacer sequence" refers to a non-coding genetic sequence that physically separates two genetic sequences from each other. In some embodiments, the circular plasmid DNA comprises at least one spacer sequence. In other embodiments, the plasmid DNA comprises two or more spacer sequences.

According to some embodiments, the step of linearizing the parental circular covalently closed synthetic plasmid DNA molecules involves subjecting the molecules to suitable restriction enzymes denoted as LRE (Linearization Restriction Enzyme) so as to cut the DNA molecules in those unique restriction enzyme sites.

According to other embodiments, the step of linearizing the DNA molecules involves subjecting the plasmid DNA to a standard PCR reaction.

As described herein, the term "suitable buffer" refers to any buffer that allows the ligation reaction to occur.

As described herein, the term "suitable bacteria" refers to any bacteria capable of recognizing the bacterial origin of replication present in the engineered circular covalently closed synthetic plasmid DNA and replicating that DNA. Non-limiting examples of suitable bacteria are: E. coli TOP10, E. coli NovaBlue, E. coli DH5a, and E. coli DH10B, amongst others. In a preferred embodiment, the suitable selected bacteria is an E. coli TOP10 bacteria.

In a sixth aspect of the present invention, we describe a process for manufacturing circular RNA comprising at least the following steps:
a. transforming the engineered parental circular covalently closed synthetic plasmid DNA of the present invention into a suitable bacteria strain, and selecting the recombinant clones by means of the bacterial selection system comprised in said parental plasmid;
b. subjecting the resulting recombinant bacteria to incubation in growth conditions to allow the replication of the engineered parental circular covalently closed synthetic plasmid DNA in order to generate a suitable mass of molecules;
c. isolating and purifying the resulting engineered parental circular covalently closed synthetic plasmid DNA molecules;
d. selecting a suitable ligation system from the group consisting of RNA ligating DNAzymes, CRISPR/dCas9-DNALigase, and Intron-Exon Mediated Ligation;
e. digesting the purified engineered parental circular covalently closed synthetic plasmid DNA with suitable restriction enzymes;
f. purifying the linearized circular RNA module scaffold of the engineered parental circular covalently closed synthetic plasmid DNA;
g. subjecting the purified linearized circular RNA module scaffold to an In Vitro Transcription reaction in order to generate linear RNA molecules;
h. subjecting the linear RNA molecules to the selected suitable circularization method; and,
i. purifying the resulting circular RNA, DNAzyme Mediated RNA Circularization (DMRC)

In embodiments of the invention, the ligation system comprises enzymes made of DNA, also called DNAzymes or deoxyribozymes, generated in the laboratory by in vitro selection from random libraries of DNA.

Figure 12:
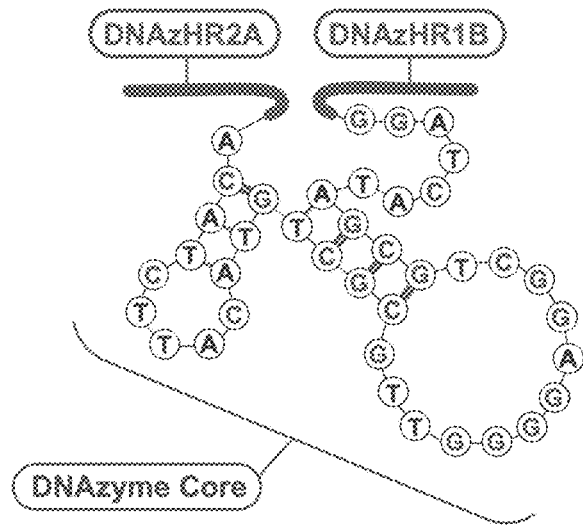
FIG. 12 is a schematic representation of the SYTE-DNAzRL12 DNAzyme, including its genetic sequence, in accordance with some embodiments of the present invention.
Figure 13:
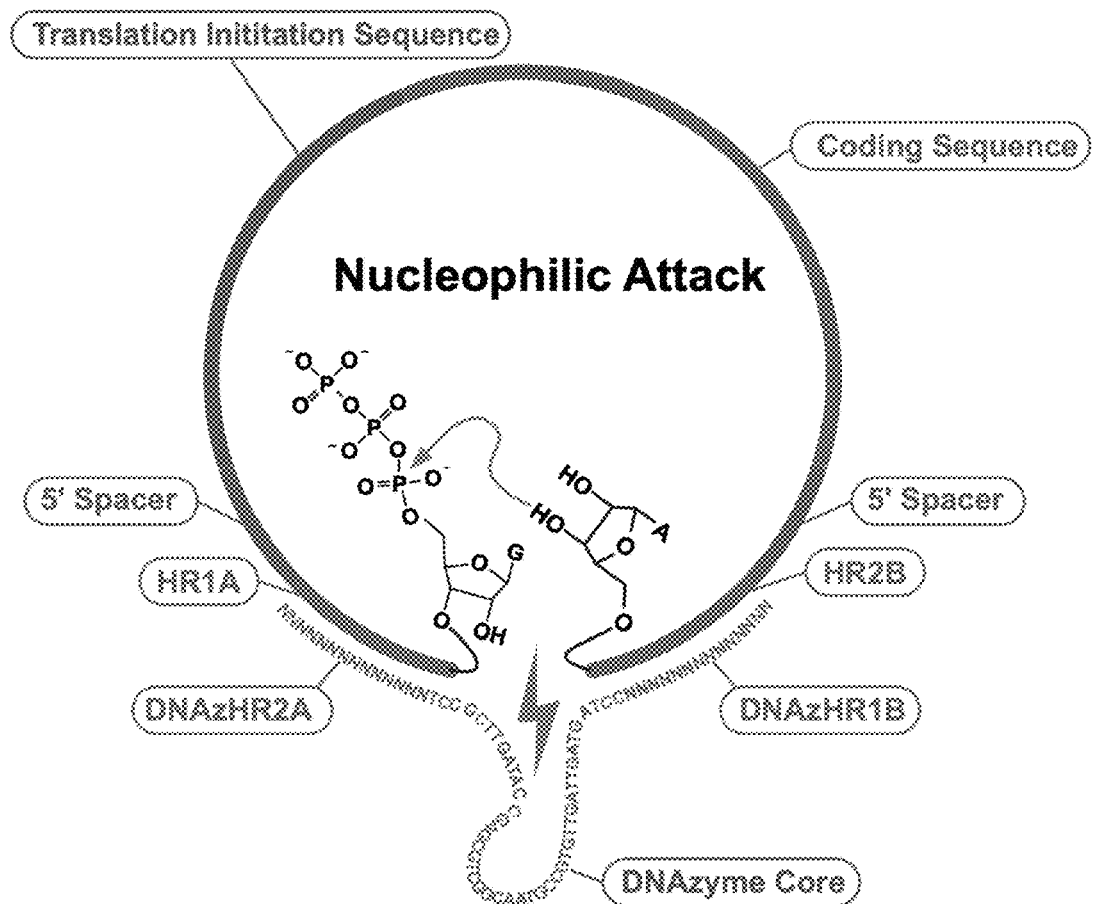
FIG. 13 is a schematic representation of the DNAzyme-mediated RNA ligation reaction for the circularization of the linear RNA.

Defined sequences of single-stranded DNA have been engineered to mediate the formation of active-site architectures that catalyze the ligation of RNA molecules creating phosphodiester bonds to generate circRNAs (FIGS. 12 and 13).

DNAzymes

DNA is best known in the form of the famous Watson-Crick double helix of two antiparallel phosphodiester single strands held together by hydrogen bonding and stacking interactions of complementary A-T and G-C base pairs. However, the ability of DNA to form three-dimensional structures reaches far beyond the static double helix, whose main purpose is to store genetic information and faithfully transmit it to the next generation. It is now well established that the information stored in defined sequences of single-stranded DNA can be exploited for the formation of active-site architectures that catalyze chemical transformations.

Initially, DNAzymes were only known to catalyze the site-specific cleavage of a ribonucleotide phosphodiester bond, but in the last years they were designed to catalyze the formation of new phosphodiester bonds for the ligation of nucleic acid fragments in different linear and branched architectures. The DNA-catalyzed formation of native 3'-5'-phosphodiester linkages between two RNA fragments functionally mimics protein enzymes such as T4 RNA ligase and facilitates protein-free access to large synthetic RNAs. The DNA enzyme hybridizes to its two RNA substrates via Watson-Crick base pairing and confers the regioselective activation of the 3'-hydroxy group of one RNA fragment (the acceptor RNA) for the nucleophilic attack at an activated 5'-phosphate group of the second RNA fragment (the donor RNA), as shown in FIG. 13. DNAzymes are also compared to DNA polymerases as they both require phosphate groups as substrates and divalent metal ions such as $Mg^{2+}$ and $Zn^{2+}$ in order to generate the phosphodiester bonds.

DNA-based enzymes can act on peptidic substrates and are capable of covalent modification of amino acid side chains, tyrosine azido-adenilation, phosphorylation of peptidic Tyr, dephosphorylation of peptidic Tyr, or covalent modification of phosphorylated amino acid chains. Other DNAzymes can act on other substrates, and are able to hydrolyze amides and esters, glycosylate or metalate a porphyrin nucleus, as well as performing Diels-Alder reactions. DNAzymes can also act on DNA substrates, and are capable of Thymine-dimer repair, DNA depuration, DNA phosphorylation, DNA capping, DNA cleavage, and DNA ligation and, lastly, DNAzymes are able to act on RNA molecules and are capable of cleaving RNA molecules and ligating them as well.

DNA-based enzymes capable of RNA ligation were heavily investigated biochemically, and the 9DB1 DNA enzyme was the first DNA catalyst for which a three-dimensional structure was determined by X-ray crystallography. The structure revealed a 31-nt double-pseudoknot architecture in the catalytic core containing long-range Watson-Crick base pairs and non-canonical hydrogen-bonding interactions that could not be predicted from any biochemical data (FIG. 7). The structure also explained the regioselectivity of ligation and proposed the involvement of a critical phosphodiester of the DNA backbone in the activation mechanism, that was further investigated by computational analyses.

DNA enzymes with catalytic activity for the desired RNA ligation were identified by in vitro selection from a DNA library containing 40 random core nucleotides, where the formation of native linkages was enforced during the devised in vitro selection strategy, by allowing only DNAzymes linked to 3'-5'-ligated products to be amplified in subsequent selection rounds. Currently, the only known application of DNAzymes is to ligate small fragments of linear RNA in order to form a longer linear fragment. Thus, the use of DNAzymes to produce circular RNAs is a novel way of circularizing RNA molecules with high efficiency.

An important aspect for practical applications of DNA enzymes is their substrate preference in terms of accepted RNA sequences, and the accessibility of donor substrates with activated phosphate groups.

Therefore, when the selected ligation system is an RNA-ligating DNAzyme, said DNAzyme comprises at least the following three sections:
  a first section, being a complementary region that targets the 5' free end of the target RNA to be ligated (DNAz-HR2A; SEQ ID NO 4);
  a second section, being a core, which is a portion of the DNAzyme with the ability to offer a stable stereo-spatial structure that creates the ideal environment for RNA to be ligated, wherein such core consists of nucleotides with a synergy within their combination that enables the hybridization of two RNA substrates via Watson-Crick base pairing; and,
  a third section, being a complementary region that targets the 3' free end of the target RNA to be ligated (DNAz-HR1B; SEQ ID NO 3).

In a preferred embodiment, the DNAzyme Core particularly consists of 40 nucleotides.

The above DNAzyme emerged as a consensus sequence from an in vitro selection experiment. In the selection procedure, linear RNA substrates were bound on their ends to complementary DNAzyme sequences. The RNA substrate bears a 5'-triphosphate group that typically reacts with 2'- or 3'-hydroxyls in RNA ligation reactions catalyzed by nucleic acid enzymes. After 10 rounds of selection, SYTE-DNAzRL12 (SEQ ID NO 8) was identified by aligning sequences of active clones and prepared independently by chemical synthesis as depicted in FIG. 7. The closely related SYTE-DNAzRL16 (SEQ ID NO 9) deoxyribozyme identified in the same selection was also prepared. The SYTE-DNAzRL12-mediated RNA ligation reaction proceeds rapidly in >90% yield, with $k_{obs}$~0.5 min$^{-1}$ at 37° C., with 40 mM MgCl$_2$ (FIG. 14).

The target RNA may include a 3'-hydroxy group at its 3' free end to serve as a nucleophile. Also, although the target RNA may end with any nucleotide, the following decreasing order of priority is preferred: A>G>U>C. The DNAzyme complementary region may be of any length and the percentage of guanine-cytosine (GC) is in the range of 20% to 80%, preferably in the range of 20% to 60%, still more preferably in the range of 40% to 60%.

The 5' free end is preferably triphosphorylated and may initiate with any nucleotide, albeit preferably Guanine. The DNAzyme complementary region may be of any length and the percentage of guanine-cytosine (GC) is in the range of 20% to 80%, preferably in the range of 20% to 60%, still more preferably in the range of 40% to 60%.

The identified deoxyribozyme SYTE-DNAzRL12 preferably ligates RNA substrates with 5'-triphosphorylated guanines on the donor strand, and the structure revealed the reason for the sequence preferences, as can be depicted in FIG. 12. Several deoxyribozymes are known to form 2',5'-branched nucleic acid architectures with 5'-adenylated RNA and DNA. However, when the SYTE-DNAzRL12 deoxyribozyme of this invention was tested with 5'-AppRNA instead of 5'-pppRNA, only poor ligation yields were obtained (<10% compared to >95% with 5'-pppRNA).

RNA-ligating DNAzymes were rationally engineered to efficiently circularize a wide range of coding and non-coding RNAs in vitro.

Figure 9:
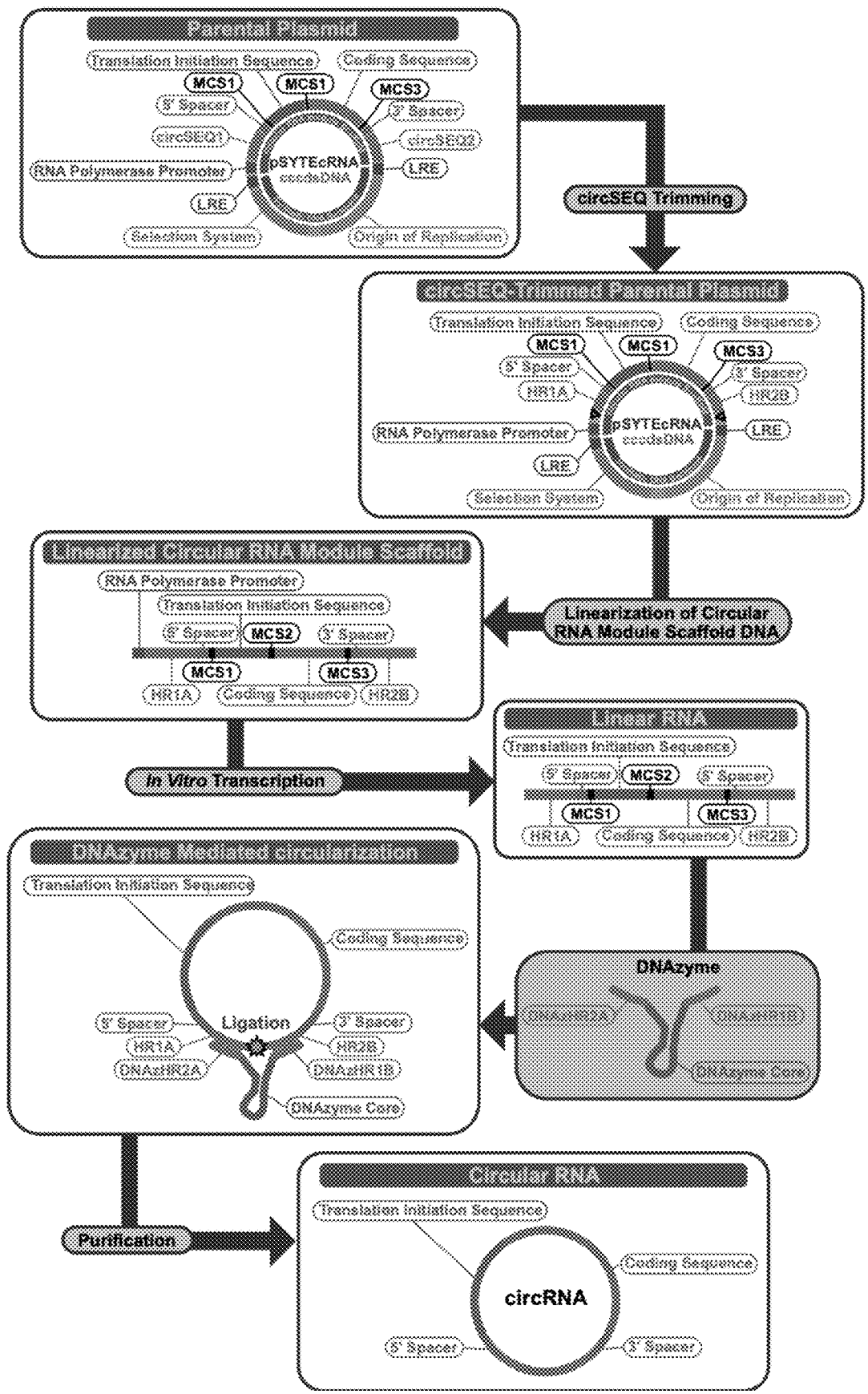
FIG. 9 is a schematic representation of the circRNA production process using an RNA-ligating DNAzyme, in accordance with some embodiments of the present invention.

As shown in FIG. 9, once an in vitro transcription reaction is performed, linear RNA molecules are generated, and after mixing the linear RNA molecules with DNAzymes and a suitable buffer, the circularization reaction occurs.

In a preferred embodiment the suitable buffer consists of 40 mM MgCl2 (Mg+2), 50 mM CHES, pH 9.0, 150 mM NaCl, 2 mM KCl, at a temperature of 37° C. Alternatively, the addition of 50 mM HEPES, pH 7.5 with lower $k_{obs}$, anticipated on the basis of the reduced pH value.

Biologically active proteins can be produced from these circRNAs in eukaryotic cells. These novel engineered circRNAs can be purified by affinity chromatography or high-performance liquid chromatography.

General Experimental Considerations for DNAzyme-Mediated RNA Circularization (DMRC)

DNA oligonucleotides were synthesized at GeneUniversal Inc. (Newark, DE) and linear RNA templates with 5'-triphosphates were prepared by in vitro transcription by T7 RNA polymerase (NEB). Engineered parental circular covalently closed synthetic plasmid DNA templates were synthesized by GeneUniversal Inc. Digestion with selected restriction enzymes, electrophoresis and purification from agarose gel, provided linear double-stranded DNA molecules used as template for in vitro transcription.

Although T7 RNA polymerase was utilized as included in the NEB's HiScribe T7 High Yield RNA Synthesis kit, transcription might be performed by a variety of RNA polymerases such as SP6 and T3. The origin of replication employed was a high copy number variant of pMB1 origin, and the selection cassette contained a transcriptional unit capable of expressing the Ampicillin resistant gene. In other embodiments, several and different origins of replication may be used such as ColE1 and pBR322, as selection genes such as Chloramphenicol and Kanamycin.

As mentioned above, the parental circular covalently closed synthetic plasmid DNA bears all the necessary sequences required for circularization by any of the three manufacturing processes (namely, DNAzyme-mediated RNA circularization, CRISPR-dCas9-Ligase-mediated RNA circularization, and Self-splicing-mediated RNA circularization). If said RNA circularization reaction is to be carried out by any of the first two processes (DNAzyme-mediated RNA circularization, CRISPR-dCas9-Ligase-mediated), the circSEQ regions must first be "trimmed" in order to remove the sequences involved in the third method (Self-splicing-mediated RNA circularization). To this end, suitable specific restriction enzyme recognition sequences were included in the circSEQs (namely, RE1A, RE1B, RE2A and RE2B; FIGS. 4 and 5).

The Homology Region HR1A, (SEQ ID NO 2) and Homology Region HR2B, (SEQ ID NO 3) RNA substrate sequences were defined in a consensus manner, resulting from the selection experiments with diverse prototypes. Whereas RNA ends showed to have an impact on ligation efficiency, different internal homology sequences lack considerable differences and may be random, conferring dynamism and adaptability to the method. Ends of preference are 5'-PPP-GGA and GGA-3'.

For all kinetic assays, the HR1A substrate was 5'-$^{32}$P-radiolabeled with $\gamma^{32}$P-ATP and T4 polynucleotide kinase (PNK). The ratio HR2A:DNAz:HR1B was 1:5:1, with the concentration of DNAz (DNAzyme) equal to ~0.5 µM. Values of $k_{obs}$ and final yield were obtained by fitting the yield versus time data directly to first-order kinetics, yield=$Y(1-e^{kt})$, where k=$k_{obs}$ and Y=final yield. The standard incubation conditions for the assays with $Mg^{2+}$ were 50 mM CHES, pH 9.0, containing 150 mM NaCl, 2 mM KCl, and 40 mM $MgCl_2$ at 37° C. Alternatively, 50 mM HEPES, pH 7.5 was effective but with lower $k_{obs}$ (data not shown), which was anticipated on the basis of the reduced pH value. The metal ion $Mg^{2+}$ is presumed to mediate specific interactions between components of the trimolecular complex required for establishing the catalytically active structure.

The detailed procedure for the analytical-scale assays was as follows for the $Mg^{2+}$-dependent deoxyribozyme. A sample was prepared that contained 1 pmol of HR2A substrate, 5 pmol of SYTE-DNAzRL12, and 1 pmol of HR1B substrate (HR2A:DNAz:HR1B=1:5:1) in 7 µL of 5 mM HEPES, pH 7.5, 15 mM NaCl, and 0.1 mM EDTA. The sample was annealed by heating at 95° C. for 3 min and then cooling on ice for 5 min. The volume was increased to 10 µL containing 50 mM CHES, pH 9.0, 150 mM NaCl, 2 mM KCl, and 40 mM $MgCl_2$. The 10-µL reaction solution was incubated at 37° C. At appropriate time points, 1-µL aliquots were quenched onto 8 µL of stop solution (80% formamide, 1×TB [89 mM each Tris and boric acid, pH 8.3], 50 mM EDTA, and 0.025% each xylene cyanol and bromophenol blue). The substrates and products were separated using 1% Agarose gel in TAE and visualized with UV light.

Accordingly, in a seventh aspect of this invention, a first circular RNA manufacturing process is provided (FIG. 9), wherein said process comprises at least the stages of:
a. transforming the engineered parental circular covalently closed synthetic plasmid DNA of the present invention into a suitable bacteria strain, and selecting of the recombinant clones by means of the bacterial selection system comprised in the parental plasmid,
b. subjecting the recombinant bacteria to incubation in growth conditions in order to allow the replication of the engineered parental circular covalently closed synthetic plasmid DNA in order to generate a suitable mass of molecules.
c. isolating and purifying the resulting engineered parental circular covalently closed synthetic plasmid DNA molecules;
d. digesting the purified engineered parental circular covalently closed synthetic plasmid DNA with a RE1A restriction enzyme and RE1B restriction enzyme to remove a portion of DNA within the first circSEQ region (circSEQ1) comprising the Exon I, Intron I and HR1B, followed by gel-electrophoresis purification of the circSEQ1-trimmed linearized parental circular covalently closed synthetic plasmid DNA;
e. religating the gel-electrophoresis purified circSEQ1-trimmed linearized parental circular covalently closed synthetic plasmid DNA;
f. transforming the circSEQ1-trimmed parental circular covalently closed synthetic plasmid DNA into a suitable bacteria strain, and selecting the recombinant clones by means of the bacterial selection system comprised in the parental plasmid,
g. isolating and purifying the resulting circSEQ1-trimmed parental circular covalently closed synthetic plasmid DNA molecules;
h. digesting the circSEQ1-trimmed parental circular covalently closed synthetic plasmid DNA with a RE2A and RE2B to remove a portion of DNA within the second circSEQ region (circSEQ2) comprising the Exon II, Intron II and HR2A, followed by gel-electrophoresis purification of the circSEQ1/2-trimmed linearized parental circular covalently closed synthetic plasmid DNA;
i. religating the gel-electrophoresis purified circSEQ1/2-trimmed parental circular covalently closed synthetic plasmid DNA molecules;
j. transforming the circSEQ1/2-trimmed parental circular covalently closed synthetic plasmid DNA into a suitable bacteria strain, and selecting the recombinant clones by means of the bacterial selection system comprised in the parental plasmid;
k. isolating and purifying the engineered parental circular covalently closed synthetic plasmid DNA with its circSEQ1/2-trimmed regions;
l. digesting the circSEQ1/2-trimmed parental circular covalently closed synthetic plasmid DNA with a combination of restriction enzymes (LRE: Linearization Restriction Enzymes);
m. purifying the circular RNA module scaffold by a suitable method;
n. subjecting the linearized circSEQ1/2-trimmed parental circular covalently closed synthetic plasmid DNA (circular RNA module scaffold) to an In Vitro Transcription reaction in order to generate linear RNA molecules;
o. subjecting the linearized RNA molecules to the DNAzyme ligation reaction in a suitable buffer in order to facilitate circularization.
p. purifying the circularized RNA molecules Engineered CRISPR/dCas9-Ligase Mediated RNA Circularization (CdC-LMRC)

In other embodiments of the invention, circularization of the RNA is achieved through the activity of a CRISPR/dCas9-DNALigase system.

Technologies derived from prokaryotic immune mechanisms known as CRISPR/Cas are multiple and assist in genetic and genomic engineering with different approaches. The most direct applications include using the Cas9 protein from *Streptococcus pyogenes* together with a customizable guide RNA as a nuclease system targeting any genomic locus in any cell. The introduction of double strand breaks (DSB) assists in the introduction of mutations by non-homologous end joining (NHEJ) or homologous recombinations (HR). However, Cas9 variants defective in their nuclease activity have also been generated (known as dead Cas9 or, more simply, dCas9), which only function as a shuttle for activities targeting nucleic acids. In this sense, the field known as CRISPRi or CRISPRa, among others, has emerged to modulate gene expression.

This implies that different protein factors with enzymatic activities that regulate and/or modify nucleic acids, be they DNA or RNA, can be fused to dCas9.

Figure 10:
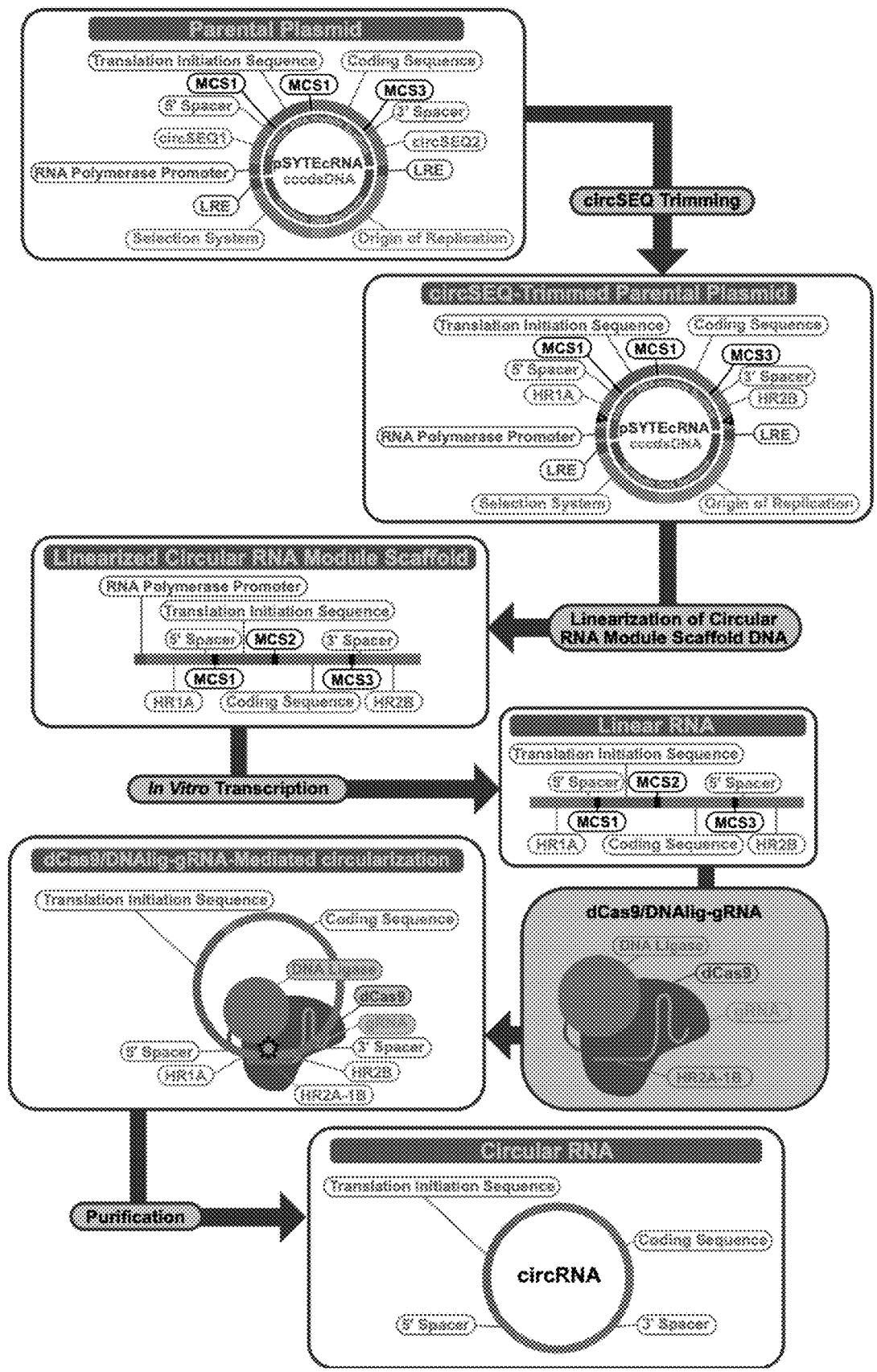
FIG. 10 is a schematic representation of the circRNA production process using CRISPR/dCas9-DNALigase gRNA-HR complex, in accordance with some embodiments of the present invention.

According to some embodiments, dCas9 is fused with T4 DNA ligase. This protein combined with a guide RNA directed to the homology regions (HR1A and HR2B) located at the ends of a linear RNA molecule, generated by IVT, assists in its circularization, as shown in FIG. 10.

As it is described in General Experimental Considerations for DNAzyme-MediatedRNA Circularization (DMRC), the parental circular covalently closed synthetic plasmid DNA must first be "trimmed" in its cirSEQ regions if the transcribed RNA is to be circularized by the DNAzyme or the CRISPR/dCas9/Ligase methods. Thus, the linear RNA resulting from the in vitro transcription is then circularized by treating it with a complex of gRNA and dCas9-Ligase.

This process uses linear RNA as a template and CRISPR/dCas9-Ligase fusion as a system that aids RNA ligation and circularization, and can be used with the parental circular covalently closed engineered circSEQ1/2-trimmed plasmid DNA described above. Once the CDS (coding sequence) or non-CDS is cloned into the backbone, amplification and linearization steps are needed. When the DNA is linearized an IVT (in vitro transcription) is performed yielding linear RNA molecules. Then, these molecules are exposed to the CRISPR/dCas9-Ligase gRNA-HR complex to allow the ligation reaction to occur, as depicted in FIG. 10. Once the linear free ends of the linear RNA molecules are ligated, a covalently closed RNA molecule is generated, and can be purified using known-in-the-art chromatographic methods such as HPLC or affinity columns.

Accordingly, when the selected ligation system is a CRISPR/dCas9-DNALigase system, said system is a synthetic fusion protein comprising the dCas9 fused to a DNA ligase by a peptidic linker, in complex with a synthetic gRNA complementary to HR1A and HR2B providing targeting for the ligase activity to join the ends and thus circularize the linear RNA molecules.

According to an eighth aspect of the invention, a second circular RNA manufacturing process is provided (FIG. 10), comprising at least the following steps:
 a. transforming the engineered parental circular covalently closed synthetic plasmid DNA of the present invention into a suitable bacteria strain, and selecting the recombinant clones by means of the bacterial selection system comprised in the parental plasmid;
 b. subjecting the recombinant bacteria to incubation in growth conditions to allow the replication of the engineered parental circular covalently closed synthetic plasmid DNA in order to generate a suitable mass of molecules;
 c. isolating and purifying the resulting engineered parental circular covalently closed synthetic plasmid DNA molecules;
 d. digesting the purified engineered parental circular covalently closed synthetic plasmid DNA with a RE1A restriction enzyme and RE1B restriction enzyme to remove a portion of DNA within the first circSEQ region (circSEQ1) comprising the Exon I, Intron I and HR1B, followed by gel-electrophoresis purification of the circSEQ1-trimmed linearized parental circular covalently closed synthetic plasmid DNA;
 e. religating the gel-electrophoresis purified circSEQ1-trimmed linearized parental circular covalently closed synthetic plasmid DNA;
 f. transforming the circSEQ1-trimmed parental circular covalently closed synthetic plasmid DNA into a suitable bacteria strain, and selecting the recombinant clones by means of the bacterial selection system comprised in the parental plasmid;
 g. isolating and purifying the resulting circSEQ1-trimmed parental circular covalently closed synthetic plasmid DNA molecules;
 h. digesting the circSEQ1-trimmed parental circular covalently closed synthetic plasmid DNA with a RE2A and RE2B to remove a portion of DNA within the second circSEQ region (circSEQ2) comprising the Exon II, Intron II and HR2A, followed by gel-electrophoresis purification of the circSEQ1/2-trimmed linearized parental circular covalently closed synthetic plasmid DNA;
 i. religating the gel-electrophoresis purified circSEQ1/2-trimmed parental circular covalently closed synthetic plasmid DNA molecules;
 j. transforming the circSEQ1/2-trimmed parental circular covalently closed synthetic plasmid DNA into a suitable bacteria strain, and selecting the recombinant clones by means of the bacterial selection system comprised in the parental plasmid;
 k. isolating and purifying the engineered parental circular covalently closed synthetic plasmid DNA with its circSEQ1/2-trimmed regions;
 l. digesting the circSEQ1/2-trimmed parental circular covalently closed synthetic plasmid DNA with a combination of restriction enzymes (LRE: Linearization Restriction Enzymes);
 m. purifying the circular RNA module scaffold by a suitable method;
 n. subjecting the linearized circSEQ1/2-trimmed parental circular covalently closed synthetic plasmid DNA (circular RNA module scaffold) to an In Vitro Transcription reaction in order to generate linear RNA;
 o. subjecting the linear RNA molecules to the dCas9/DNA Ligase chimera for its circularization;
 p. purifying the circularized RNA molecules.

Self-Complementary Intron-Exon Mediated Ligation (SCIEML)

In some embodiments, the Self-Complementary Intron-Exon Mediated Ligation circularization method comprises an engineered Permuted Intron-Exon Self-Splicing Ribozyme present in the circularization sequences circSEQ1 and circSEQ2. The engineered ribozyme comprises a 3'-proximal group I intron derived sequence. Said sequence includes the 3' intron fragment with splice site dinucleotides and an adjacent natural exon sequence; and the 5' intron fragment comprises a 5'-proximal group I intron-derived sequence that includes the 5' splice site dinucleotide and a sequence corresponding to the adjacent natural exon.

In other embodiments of the present invention, the ligation method comprises the full circularization sequences (circSEQ1 and circSEQ2) that harbors the engineered ribozyme sequences and homology regions.

Circularization sequence circSEQ1 is composed of an engineered ribozyme flanked by homology regions denoted as HR1B in 5' and HR1A in 3' as depicted in FIG. 4. On the other hand, circSEQ2 sequence is composed of an engineered ribozyme flanked by homology regions denoted as HR2B in 5' and HR2A in 3' as depicted in FIG. 5.

In accordance with some embodiments, full circSEQ1 sequence comprises the following elements linked to each other and arranged in the following sequence fashion:

HR1A (Homology Region 1A)
Engineered ribozyme comprised by a portion of a group I intron (Intron I) and an exon (Exon I) sequences
HR1B (Homology Region 1B)

In accordance with some embodiments, full circSEQ2 sequence comprises the following elements linked to each other and arranged in the following sequence fashion:

HR2B (Homology Region 2B)
Engineered ribozyme comprised by a portion of exon (Exon II) and a portion of a group I intron (Intron II) sequences
HR2A (Homology Region 2A)

In some embodiments the permuted self-splicing group I intron fragment can be selected from, but not limited to, T4 phage group I introns, *Anabaena* group I introns, and *Azoarcus* bacterium group I introns. In a preferred embodiment, the selected group I intron fragment is *Anabaena* group I intron.

In some embodiments, the circSEQ1 (SEQ ID NO 10) comprises the following elements operably linked to each other and arranged in the following sequence:
- a 5' homology region denoted as HR1B;
- a 3' permuted self-splicing group I intron fragment containing a 3' splice site dinucleotide, part of the adjacent exon; and,
- a 5' homology region denoted as HR1A.

In some embodiments, the cirSEQ2 (SEQ ID NO 11) comprises the following elements operably linked to each other and arranged in the following sequence:
- a 3' homology region denoted as HR2B;
- a 5' permuted self-splicing group I intron fragment containing a 5' splice site dinucleotide, part of the adjacent exon; and,
- a 3' homology region denoted as HR2A.

According to some embodiments, the step of linearizing the DNA molecules involves subjecting the plasmid DNA to suitable restriction enzymes so as to cut the DNA molecules in the unique restriction enzyme sites.

According to other embodiments, the step of linearizing the DNA molecules involves subjecting the plasmid DNA to PCR reaction.

This process may further comprise a step of purifying the resulting circular RNA molecules, preferably by any chromatographic method of interest known in the art.

In some embodiments, the step of purifying the circRNA molecules involves running the solution containing the circRNA through a size-exclusion column in tris-EDTA or citrate buffer in a high-performance liquid chromatography (HPLC) system, preferably at a pH range 4-8 at a flow rate of about 0.01-10 mL/min.

The aforementioned steps of purifying the circRNA molecules may further involve treating the circRNA with phosphatase after running the solution containing the circRNA through the size-exclusion column, thereby producing purified circRNA molecules suitable for a pharmaceutical formulation. The phosphatase treatment can be followed by RNase R treatment.

The resulting purified circRNA may be formulated into nanoparticles.

According to some embodiments, the process further comprises an in vitro transcription reaction that can be carried out with natural or unnatural modified nucleotides, and the step of incubating the circRNA precursor IVT generated RNA molecule in a suitable buffer and controlled conditions. A suitable buffer may comprise magnesium ions and guanosine nucleotide or nucleoside (either modified or unmodified). In some embodiments "controlled conditions" refers to a temperature between 20 and 50 degrees Celsius.

Figure 11:
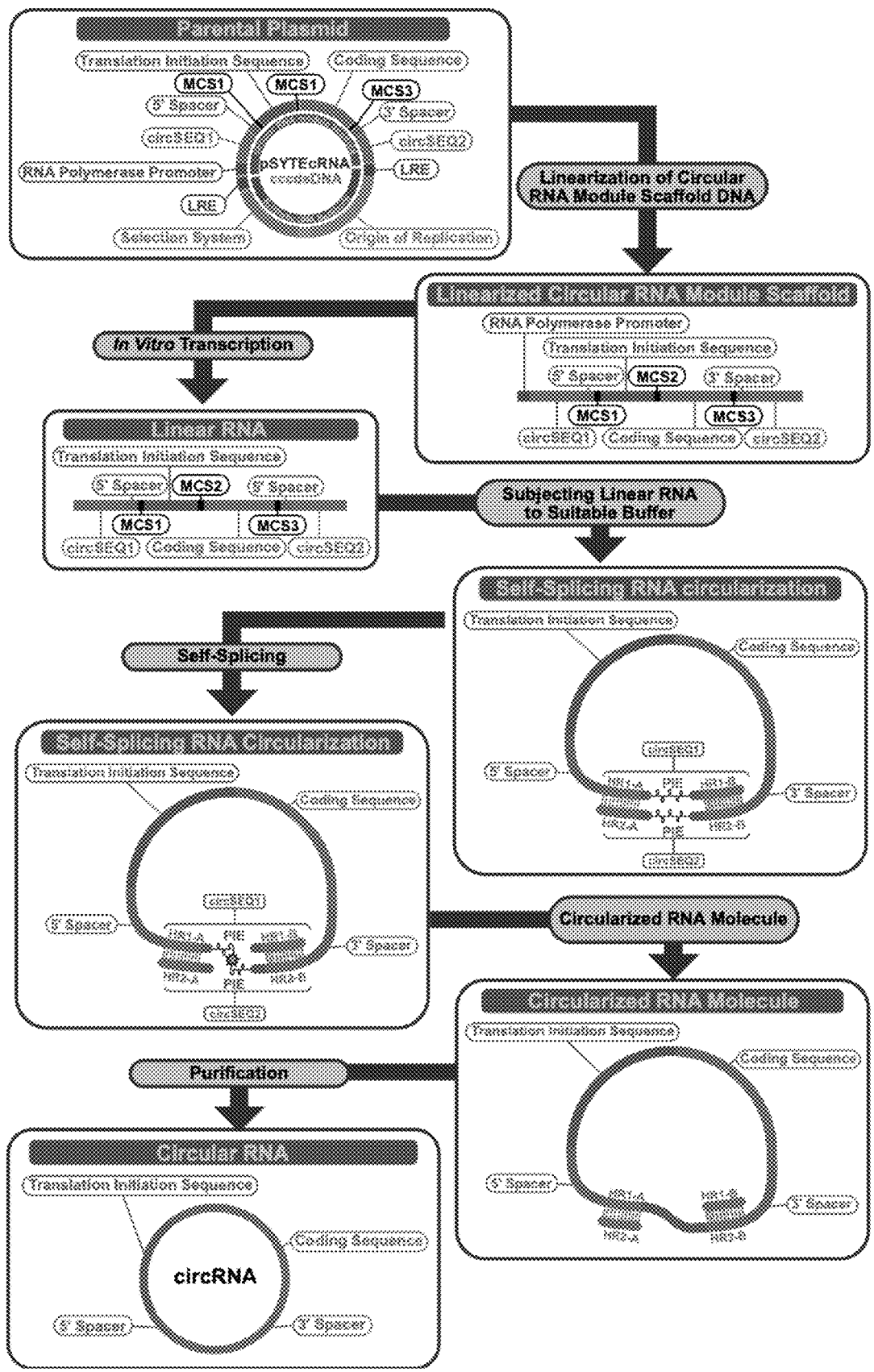
FIG. 11 is a schematic representation of the circRNA production process using the Self-Complementary Intron-Exon Mediated RNA Ligation method.

Once the plasmid DNA template is linearized by the restriction enzyme sites or PCR reaction and purified, an in vitro transcription reaction is performed to generate linear RNA molecules. As these molecules are generated, self-complementary sequences flanking the ribozymes in 5' and 3' (HR1B, HR1A, HR2B and HR2A) self-anneal and bring the auto-catalytic ribozyme sequences near enough to allow the self-splicing and self-ligation reaction, as can be appreciated in FIG. 11. As a result, a circular covalently closed RNA molecule is generated and can be further purified by chromatographic methods such as HPLC or affinity columns.

Concatemers produced by the annealing of individual linear RNA molecules can occur and, as a result, multi-transcriptional unit circular RNA molecules can be produced. These concatemers are not a problem because they are translation competent, meaning that they can produce recombinant proteins in a biological system.

Self-Complementary Intron-Exon Mediated Ligation (SCIEML) is a novel ligation technique that enables formation of physiological covalently closed circular RNA molecules with no intramolecular formation of double-stranded stem sequences, thus avoiding unwanted immune responses and downregulation of encoded protein expression.

Accordingly, when the selected ligation system is an Intron-Exon Mediated Ligation system, the engineered parental circular covalently closed synthetic plasmid DNA with full circSEQ1 and circSEQ2 sequences and a suitable buffer is used.

In a ninth aspect of the present invention, a third circular RNA manufacturing process is provided (FIG. 11), wherein said process comprises at least the stages of:

a. transforming the engineered parental circular covalently closed synthetic plasmid DNA into a suitable bacteria strain, and selecting the recombinant clones by means of the bacterial selection system comprised in the parental plasmid;

b. subjecting the recombinant bacteria to incubation in growth conditions to allow the replication of the engineered parental circular covalently closed synthetic plasmid DNA in order to generate a suitable mass of molecules.

c. isolating and purifying the resulting engineered parental circular covalently closed synthetic plasmid DNA molecules;

d. digesting the purified engineered parental circular covalently closed synthetic plasmid DNA with suitable restriction enzymes;

e. purifying the linearized circular RNA module scaffold;

f. subjecting the linearized circular RNA module scaffold to an In Vitro Transcription reaction in order to generate linear RNA molecules;

g. subjecting the linearized RNA to a suitable buffer in order to permit the self-paring of the homology sequences HR1A-HR2A and HR1B-HR2B within the circSEQ1 and circSEQ2 sequences followed by a spontaneous autocatalytic self-splicing event in order to generate circular RNA molecules.

h. purifying the circularized RNA molecules.

A further aspect of the current invention is any circular RNA platform (circRNA) manufactured by any of the novel processes provided above or their combinations.

The details described below are valid for all the aforementioned different aspects of the invention.

Transcriptional Unit

1. IRES

In some embodiments, the IRES element is derived from a DNA sequence from an organism including, but not limited to, an animal, a plant, a fungus, a bacterium, a virus, an algae, or a protozoan.

In some embodiments, viral IRES are sequences at least partially derived from a virus including, but not limited to, encephalomyocarditis virus (ECMV), Coxackievirus B3 (CVB3), Taura Syndrome Virus (TSV), Triatoma Virus (TV), Human mastadenovirus C (HAdV-C), Human adenovirus 5 (HAdV5), Human adenovirus 7 (HAdV7), Human mastadenovirus B (HAdV-B), Hepatitis GB virus B (HGBV-B), HPV31, Human Poliovirus 3 (HPV-3), Human papillomavirus type 11 (HPV 11), Human immunodeficiency virus 1 (HIV-1), Human immunodeficiency virus 2 (HIV-2), Simian T-lymphotropic virus 1 (STLVs-1), Human Parvovirus B19 (HPB19), Human betaherpesvirus 6B (HHV-6B), Human alphaherpesvirus 3 (HHV-3), Human papillomavirus type 41 (HPV41), Human papillomavirus type 6b (HPV6b), Alphapapillomavirus 7, Friend murine leukemia virus, Heilovirus (ThV), Rous sarcoma virus (RSV), Human mastadenovirus F (HAdv-F), Human papillomavirus type 4 (HPV4), Human papillomavirus type 63 (PHV63), Human mastadenovirus A, Feline immunodeficiency virus (FIV), Human T-lymphotropic virus 2 (HTLV-2), Jaagsiekte sheep retrovirus (JSRV), Spleen focus-forming virus (SFFV), Mouse mammary tumor virus (MMTV), Murine osteosarcoma virus (MOV), Ovine lentivirus (OLV/OvLV), Squirrel monkey retrovirus (SMRV), Human papillomavirus type 16 (HPV16), Human papillomavirus type 5 (HPV5), Human polyomavirus 1, Rabies lyssavirus, Simian immunodeficiency virus (SIV), Human papillomavirus type 10 (HPV10), Human papillomavirus type 26 (HPV26), Human papillomavirus type 32 (HPV32), Human papillomavirus type 34 (HPV34), Marburg margurgvirus, Enterovirus A, Rhinovirus A, Human betaherpesvirus 6A (HHV-6A), *Macaca mulatta* polyomavirus 1, Snakehead retrovirus (SnRV), Bovine foamy virus (BFV), *Drosophila* C virus (DCV), Hendra henipavirus (HeV), Aichi virus 1 (AiV-1), Influenza B virus (IBV), Zaire ebolavirus (ZEBOV), Human coronavirus 229E (HCoV-229E), Nipah henipavirus (NiV), Human respirovirus 1 (HPIV-1), Modoc virus (MODV), Sudan ebolavirus, Human parvovirus 4 G1, Rotavirus C, Human gammaherpesvirus 4 (Epstein-Barr virus).

In some embodiments, eukaryotic IRES are sequences at least partially derived from a virus including, but not limited to, *Homo sapiens* IRES, Aplysia *californica* IRES, *Canis lupus familiaris* IRES, *Drosophila melanogaster* IRES, *Gallus gallus* IRES, *Mus pahari* IRES, *Mus musculus* IRES, *Saccharomyces cerevisiae* IRES, *Zea mays* IRES, *Rattus norvegicus* IRES, *Ovis aries* IRES.

In some embodiments, the IRES element comprises a novel synthetic IRES, for instance: SYTE-IRES1, SYTE-IRES2, SYTE-IRES3, SYTE-IRES4 amongst others.

In some embodiments, the circular polyribonucleotide includes at least one IRES flanking at least one or more open reading frames. In some embodiments, the IRES flanks both sides of one or more open reading frames. In some embodiments, the circular polyribonucleotide includes at least one IRES sequence on one or both sides of each open reading frame.

2. MIRES

In some embodiments, the circular polyribonucleotide may be translated by another cap-independent mechanism. In some embodiments the cap-independent mechanism is mediated by the methylation of the nitrogen at position 6 in the adenosine base, N6-methyladenosine (m6A), within the circular polyribonucleotide.

N6-methyladenosine (m6A) is a reversible epitranscriptomic modification found in several eukaryotic mRNAs, and when present in the 5' untranslated region (5'UTR), even a single m6A, promotes cap-independent translation. These sites are called m6A induced ribosome engagement sites (MIRES).

MIRES stimulate selective mRNA translation in stress conditions by a mechanism that involves the direct binding of the initiation factor eIF3. MIRES-dependent translation initiation should contain an RRACH (R=Guanine or Adenine, H=Adenine or Cytosine or Thymine) consensus motif of m6A modification close to the start codon.

The m6A machinery allows the circular polyribonucleotide to be marked as self or endogenous. When using chemical or enzymatic circularization of RNA molecules, it is beneficial to use m6A dependent translation to avoid unwanted immune responses. When m6A RRACH motifs are incorporated in a circular polyribonucleotide, RIG-1 mediated immunogenicity is decreased by 10,000 fold, compared to mutated m6A RRACH motifs. Marking a circular polyribonucleotide as self with m6A RRACH motifs constitutes an important parameter if these molecules are to be used as therapeutics.

In some embodiments, the circular polyribonucleotide may have one or more m6A sites close to the start codon.

3. Untranslated Regions (UTRs)

In some embodiments, the circular polyribonucleotide can comprise untranslated regions (UTRs), that are genetic sequences that can be transcribed but are not translated.

In some embodiments, one or more UTR sequences may be included upstream of the translation initiation sequence of an open reading frame. In some embodiments one or more UTR sequences may be included downstream of an expression sequence.

In some embodiments, the circular polyribonucleotide comprises at least one UTR sequence with embedded tranches of Adenosines and Uridines within. In some embodiments, these A-U rich elements (AREs) may increase the expression rates of the circular polyribonucleotide.

In some embodiments, introduction, removal or modification of UTR AREs may be useful to modulate the stability, immunogenicity and translation rate of the circular polyribonucleotide.

In some embodiments, the circular polyribonucleotide may contain one or more copies of AREs that may modulate translation of the coding sequence.

In some embodiments, the circular polyribonucleotide may be engineered to remove AREs to modulate the intracellular stability and thus the translation of the coding sequence.

It should be understood that any UTR from any gene and any organism may be incorporated into the respective flanking regions of the circular polyribonucleotide. Furthermore, multiple wild-type UTRs of any known gene may be utilized. It is also within the scope of the present invention to provide artificial UTRs which are not variants of wild type genes.

In some embodiments, the UTRs or portions thereof, may be placed in the same orientation or altered orientation or location as from where they were selected.

In some embodiments, a 5' or 3' UTR may be inverted, shortened, lengthened, and/or chimerized with one or more other 5' or 3' UTRs.

As used in this patent, the term "altered" when referring to a UTR sequence, means that the UTR sequence has been changed in some way in relation to a reference sequence.

In some embodiments, more than one 5' and/or 3' UTR may be used. For example, a "double" UTR is one in which two copies of the same UTR are encoded in series or substantially in series.

4. Sequence of Interest

The sequence of interest may be a coding, translation competent genetic sequence or a non-coding, translation incompetent genetic sequence.

a. Translation Competent Coding Sequences i. Translation Initiation

In some embodiments, the circular polyribonucleotide can encode a polypeptide and may comprise a translation initiation sequence such as, but not limited to, a start codon. In some embodiments the circular polyribonucleotide includes at least one translation initiation sequence adjacent to an open reading frame. In some embodiments the start codon is a non-coding start codon. In some embodiments, the translation initiation genetic sequence can include a Shine-Dalgarno or Kozak sequence. In some embodiments the Shine-Dalgarno or Kozak sequence may be adjacent to an open reading frame (ORF). In some embodiments the translation initiation sequence may be placed in either or both sides of each open reading frame. In some embodiments, the translation initiation sequence may provide a conformational flexibility to the circular polyribonucleotide.

In some embodiments the circular polyribonucleotide may include at least one start codon and translation may initiate on the first start codon or may initiate downstream the first start codon. In some embodiments the translation of the polyribonucleotide may initiate at an alternative translation initiation sequence, such as, but not limited to, AAG, ACG, AGG, ATA/AUA, ATT/AUU, CTG/CUG, GTG/GUG, and TTG/UUG. In some embodiments, the translation may begin under selective conditions, such as, but not limited to, cell type, cell condition and stress conditions. In some embodiments the circular polyribonucleotide may begin translation at a repeat-associated non-AUG (RAN) sequence.

II. Coding Sequence

In some embodiments the circular polyribonucleotide may encode prokaryotic and/or eukaryotic peptides or polypeptides of interest, selected from, but not limited to, biologics, antibodies, antigens, therapeutic peptides or polypeptides, cell penetrating peptides, secreted proteins, plasma membrane anchored proteins, cytoplasmic proteins, cytoskeletal proteins, intracellular membrane bound proteins, nuclear proteins, proteins associated with any human disease, targeting moieties or those proteins encoded by the human genome for which no therapeutic indication has been identified but which nonetheless have utility in areas of research and discovery.

As indicated herein, "Therapeutic protein" refers to a protein that, when administered to an organism, has a therapeutic, diagnostic and/or prophylactic effect, and/or elicits a desired biological and/or pharmacological effect.

In some embodiments, the circular polyribonucleotide disclosed herein, may encode one or more biologics. As used herein, a "biologic" is a peptide or polypeptide produced by the methods provided herein and which may be used to prevent, diagnose, mitigate, treat, or cure a serious disease or medical condition.

According to the present invention, biologics include, but are not limited to, vaccines, monoclonal antibodies, bi-specific antibodies, tri-specific antibodies, chimeric antigen receptors, allergenics, blood components, gene therapies, mammalian organ, tissue or cellular products, cytokines, immunomodulators, growth factors and enzymes amongst others.

In some embodiments, one or more biologics can be encoded and translated by the circular polyribonucleotide of the present invention.

In some embodiments, the circular polyribonucleotide can encode one or more antibody fragments and combinations thereof. The term "antibody" includes monoclonal antibodies, which may include full length antibodies with a Fc region, antibodies with poly epitope specificity, multispecific antibodies such as, but not limited to, bi-specific antibodies, diabodies, single chain molecules, VHH antibodies and antibody fragments. As described herein, the term "immunoglobulin" (Ig) is used interchangeably with the term "antibody". As described herein, the term "monoclonal antibody" refers to an antibody obtained from an identical population of antibodies. Monoclonal antibodies are highly specific and are directed against a single antigenic site.

In some embodiments, monoclonal antibodies include "chimeric" antibodies in which a portion of the heavy and/or light chain is homologous to antibodies derived from a particular species or correspond to a particular antibody class or subclass.

In some embodiments, the circular polyribonucleotide may include any of the five classes of immunoglobulins, IgA, IgD, IgE, IgG, and IgM, including the heavy chains designated alpha, delta, epsilon, gamma, and mu, respectively. In some embodiments, the circular polyribonucleotide may include any subclass of antibody such as, but not limited to, IgA1, IgA2, IgG1, IgG2, IgG3, and IgG4.

In some embodiments, the circular polyribonucleotide may encode whole antibodies or antibody fragments of interest which include, but are not limited to, Fab, Fab', F(ab'), Fv, diabodies, linear antibodies, nanobodies, bi-specific antibodies, tri-specific antibodies, tetra-specific antibodies, single-chain fragment variable, multispecific antibodies, or combinations thereof.

In some embodiments, the circular polyribonucleotide may encode one or more antibody sequences that are currently being on the market or in development.

In some embodiments, the circular polyribonucleotide may encode antibodies to treat or prevent diseases in several therapeutic areas such as, but not limited to, immunology, endocrinology, dermatology, oncology, musculoskeletal, respiratory, central nervous system, gastrointestinal and infectious.

In some embodiments, the circular polyribonucleotide disclosed herein, may encode one or more vaccine antigens.

As indicated herein, "vaccine antigen" refers to a peptide or polypeptide that improves immunity to a particular disease or infectious agent.

In some embodiments, the circular polyribonucleotide may encode one or more vaccine antigens. In some embodiments, the antigens encoded may be used to treat or prevent diseases in many therapeutic areas such as, but not limited to, cancer, allergy, and infectious diseases.

In some embodiments, the circular polyribonucleotide of this invention may encode one or more antimicrobial peptides isolated from a wide range of animals such as, but not limited to, microorganisms, plants, invertebrates, amphibians, birds, fish, and mammals.

In some embodiments, the circular polyribonucleotide of this invention may encode antimicrobial peptides that may block cell fusion of viral entry. In some embodiments, the antimicrobial peptides may be part of viral encoded proteins.

In some embodiments, the circular polyribonucleotide described in this invention, may encode one or more cell penetrating peptides. As used herein, "cell penetrating peptide" refers to a polypeptide which may facilitate the cellular uptake of other polypeptides or molecules. In some embodiments, the cell penetrating peptide, may be fully or partially labeled. In some embodiments, the cell penetrating peptide may include a signal peptide. As used herein, a "signal sequence" refers to a sequence of amino acid residues bound at the amino terminus of a nascent protein during protein translation, that enables the polypeptide for example to be secreted. In some embodiments, the signal sequence may be used to signal the secretion of the cell-penetrating peptide.

In some embodiments, the circular polyribonucleotide described in this invention may encode a fusion protein. In some embodiments, the fusion protein may be created by operably linking two proteins of interest. As used herein, "operably linked" refers to the connection of two proteins in such a way to permit the expression of the complex when introduced into a cell.

In some embodiments, the circular polyribonucleotide encodes a plasma membrane anchored protein, a cytoplasmic protein or cytoskeletal protein. In some embodiments, the circular polyribonucleotide encodes a nuclear protein.

In some embodiments, the circular polyribonucleotide of this invention encodes and is able to express a protein associated with a mammalian disease. In some embodiments, the mammalian disease is a human disease.

In some embodiments the circular polyribonucleotide may encode proteins such as, but not limited to, VEGF, Hemoglobin, FIX, cancer-specific antigens, gene editing enzymes, Zinc Fingers, Nucleases, Cas9, and TALENs As described herein, a polypeptide may be a single molecule, or a multi-molecular complex such as, but not limited to a dimer, trimer, or tetramer.

In some embodiments the polypeptide may also comprise single-chain or multi-chain polypeptides that may be associated or linked.

In some embodiments, circular polyribonucleotides derived from any of the methods described above encodes viral or non-viral RNA dependent RNA polymerases that can amplify and generate multiple copies of linear or circular RNA molecules in vivo.

In preferred embodiments, the RNA dependant RNA polymerases that yield self-amplifying circular RNA molecules can be selected from, but not limited to, non-structural proteins (NSP) from Flaviviruses, Measles Viruses, Alphavirusues, and bacteriophage-derived.

In some embodiments, the coding sequences embedded in the parental plasmid DNA may be codon optimized to permit an efficient translation of peptides or polypeptides that may be derived from different organisms than the host organism.

II. Riboswitches

In some embodiments, the circular polyribonucleotide comprises one or more riboswitches.

A riboswitch is an RNA sequence that can directly bind to a small target molecule, and the binding to that molecule directly affects RNA translation, thus the circular polyribonucleotide that includes a riboswitch is directly involved in regulating its own activity depending on the presence or absence of its target molecule.

In some embodiments, a riboswitch may have an aptamer-like affinity for a specific molecule, thus, these riboswitches may be used for sequestration of molecules from bulk amounts.

In some embodiments, the riboswitch may have an effect on gene expression, including, but not limited to, transcriptional termination, inhibition of translation initiation, mRNA self-cleavage, alteration of splicing pathways, binding to a trigger molecule to activate or inactivate gene expression.

In some embodiments, the circular polyribonucleotide may be subjected to conditions that may activate, deactivate, or block the gene expression. Expression can be altered as a result of blocking the ribosome binding site.

In some embodiments, the circular polyribonucleotide binding to a molecule or an analog thereof can, depending on the nature of the riboswitch, reduce or prevent, promote or increase the expression of the RNA molecule

IV. Aptazymes

In some embodiments, the circular polyribonucleotide can comprise one or more aptazymes.

An aptazyme is a genetic switch that can be used for conditional gene expression in which the aptamer region is used as an allosteric control element and can be coupled to a catalytic RNA ribozyme sequence.

In some embodiments, the circular polyribonucleotide comprises an aptazyme that is active under specific cell states. In some embodiments, the specific cell state may include, but is not limited to, viral infection, or the presence of viral nucleic acids or proteins.

A ribozyme, or ribonucleic acid enzyme, is an RNA molecule that catalyzes a chemical reaction. Many ribozymes that are found in nature catalyze the hydrolysis of their own phosphodiester bonds or the hydrolysis of other RNA or DNA bonds. Ribozymes are able to catalyze other types of chemical reactions such as, but not limited to, covalent modification of amino acid side chains, tyrosine azido-adenilation, phosphorylation, dephosphorylation, covalent modification of phosphorylated amino acid side chains, amide and ester hydrolysis, Diels-Alder reaction, glycosylation, porphyrin metalation, RNA cleavage, RNA ligation, thymine-dimer repair, DNA depuration, DNA phosphorylation, DNA capping, DNA cleavage, and DNA ligation.

In some embodiments, it may be advantageous to place many copies of a ribozyme and aptamers within a non-coding RNA.

In some embodiments, non-limiting examples of ribozymes may include hammerhead ribozyme, VL ribozyme, leadzyme and hairpin ribozyme.

In some embodiments, the aptazyme encoded in the circular polyribonucleotide may also permit the self-regulation of the gene expression. In some embodiments, the polyribonucleotide gene expression may be autoregulated by the presence of an aptazyme that is activated by the product encoded in the same polyribonucleotide sequence. In some embodiments, the activity of the aptazyme can be sensitive to the accumulation of the protein product encoded within the polyribonucleotide or any other cellular macromolecule.

v. 2A Peptides

In some embodiments, the circular polyribonucleotide can comprise one or more 2A peptides.

Viral derived self-cleaving 2A peptides are promising candidates for the production of multicistronic RNA therapeutic molecules due to their small size and self-cleavage ability. Most 2A peptides are composed of 16-20 amino acids and are taken from viral RNA. The most common 2A peptides used to produce multicistronic vectors are F2A (Foot-and-Mouth Disease virus), E2A (Equine Rhinitis Virus), P2A (Porcine Teschovirus-1), and T2A (Thosea Asigna Virus). 2A peptide cleavage is not mediated by proteases, but it is mediated via ribosomal skip mechanism. The cleavage sites of these peptides are located between the C-terminal glycine of 2A and the N-terminal proline of 2B. This process takes place inside the ribosome during protein synthesis, where the formation of a normal peptide bond between these amino acids at the cleavage site is inhibited, but the cleavage does not affect the translation of the subsequent protein, since ribosome dissociation does not occur.

The use of elongated 2A with the additional spacers in the N-terminus of 2A peptide sequence can provide an efficient cleavage reaction, since it leads to a decrease in the inhibition rate of the 2A cleavage reaction. The insertion of additional spacer sequences such as the furin cleavage site or a glycine-serine-glycine (GSG) spacer flexible linker can yield better cleavage.

The combination of 2A peptide sequences in the following order, namely T2A, P2A, and E2A, is optimal when creating multicistronic vectors containing four genes.

b. Non-Coding Sequences i. Regulatory Nucleic Acids

In some embodiments, the circular polyribonucleotide may comprise at least one expression sequence that encodes a regulatory nucleic acid. In some embodiments the regulatory nucleic acid sequence may modify the expression of an endogenous or exogenous gene. In some embodiments, the regulatory nucleic acid can comprise a regulatory non-coding RNA, such as, but not limited to, exRNA, hnRNA, lncRNA, microRNA, rRNA, shRNA, snoRNA, snRNA, siRNA, scaRNA, Y RNA, piRNA, miRNA, tRNA and rRNA, iRNA. In some embodiments the regulatory non-coding RNA sequences may hibridize to an endogenous genetic sequence or an exogenous genetic sequence such as viral DNA or RNA.

In some embodiments the non-coding regulatory RNA sequences can comprise a guide RNA (gRNA) or a single guide RNA (sgRNA) that may recognize specific DNA sequences. In some embodiments the sgRNA mimics a naturally occurring crRNA-tracrRNA complex and may contain both a tracrRNA that binds to the nuclease, and at least one crRNA that guides the nuclease to the sequence targeted for editing. In some embodiments, the gRNA and sgRNA is used as a part of the CRISPR/Cas system for gene editing.

In some embodiments, the circular polyribonucleotide can comprise a sequence encoding one or more peptides or polypeptides, one or more regulatory sequences, one or more regulatory nucleic acids, one or more non-coding RNAs, one or more expression sequences, and any combination thereof.

Delivery

In some embodiments, in order to achieve the expected efficacy, the circRNA may be formulated with suitable delivery vehicles through known methods. These delivery vehicles include but are not limited to: polymers, polymeric carriers, membrane lipid bilayers, liposomes, lipid nanoparticles, protein nanoparticles, viral-derived envelopes, and/or capsides. In some embodiments, delivery methods may include transfection, electroporation, and/or fusion.

In some embodiments, a pharmaceutical composition or formulation refers to a form of administration, e.g., systemic, local, intratumoral, peritumoral, subcutaneous, intramuscular. Suitable forms, in part, depend upon the use or the route of entry, for example oral, by inhalation or injection. These compositions or formulations are prepared according to any method known in the art for the manufacture of pharmaceutical compositions.

Uses of Circular Polyribonucleotides

In some embodiments, circular polyribonucleotides may be used as a vaccine platform. In some embodiments circRNA vaccines may comprise an antigenic sequence.

In some embodiments, circRNA molecules may be used as therapeutics for areas such as, but not limited to, genetic diseases, metabolic diseases, hematology, neurology, oncology, immunology, cardiology, respiratory, gastroenterology, ophthalmology, musculoskeletal disorders, and dermatology.

Assays and Experiments

The recombinant circular covalently closed plasmid DNA templates to generate linear RNAs by in vitro transcription were designed in-silico and chemically synthesized, molecularly cloned and sequenced by GeneUniversal Inc.

The DNAzymes were generated in the laboratory by in vitro selection from random libraries of DNA containing 40 random nucleotides. Starting template oligonucleotides were chemically synthesized by Macrogen.

Protein complex dCas9-DNALigase was generated in *E. coli* BL21(DE3) using the synthesized engineered sequence inside pET28a plasmid, and the GuideRNA complementary to HR1/HR2 was generated by In Vitro Transcription in our laboratory.

DNAzyme Mediated RNA Circularization

The pSYTEcRNA plasmid was amplified in *E. coli* TOP10 and once purified and quantified it was subjected to PCR reaction to linearize the sequence of interest. An analytical agarose gel electrophoresis was performed to visualize the presence of the DNA molecules as depicted in FIG. 15.

Figure 16:
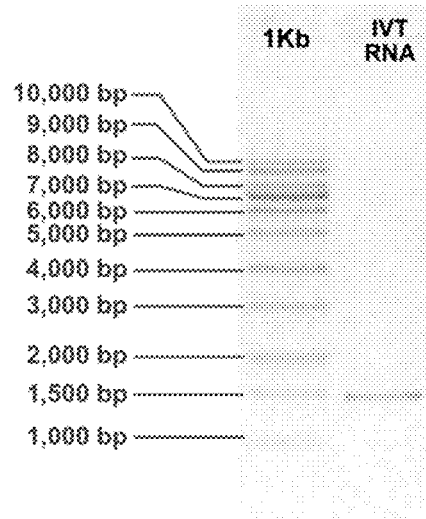
FIG. 16 is an analytical agarose gel electrophoresis showing the IVT generated linear RNA from pSYTEcRNA previously treated with RNAse Free-DNAse I

Once linearized and purified, DNA molecules were subjected to an In vitro transcription reaction, where linear RNA molecules were produced, as shown in FIG. 16.

Once the linear RNA molecules were correctly generated, they were treated with the DNAzyme SYTE-DNAzRL12 to permit the ligation of the linear RNA ends, thus giving rise to covalently closed circular polyribonucleotides. To confirm circularization, a treatment with RNAse-free DNAse I was carried out to digest SYTE-DNAzRL12, and after circRNA purification, a second enzymatic treatment with RNAse R was performed. As depicted in FIG. 17, circRNA molecules were not digested by RNAse R enzyme, and the linear RNA molecules used as control were totally degraded when subjected to this enzyme.

Figure 20:
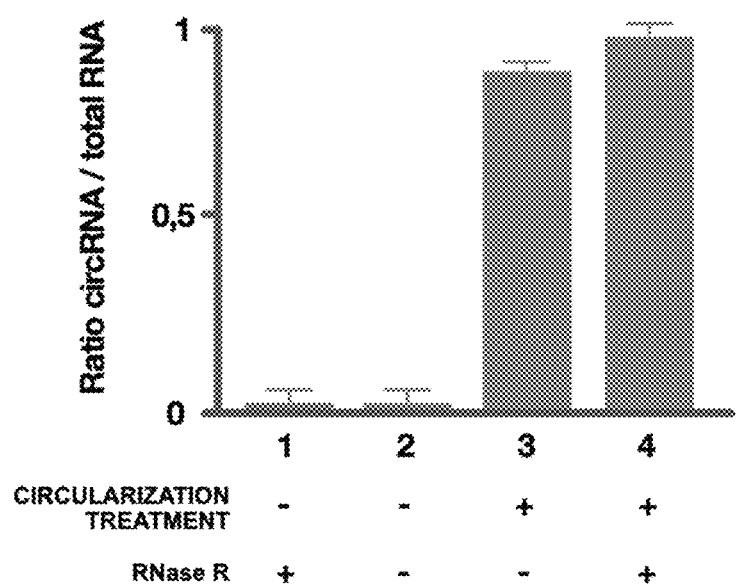
FIG. 20 is a graph representing the Ratio of circRNA/total RNA obtained by qPCR for the DNAzyme mediated RNA ligation method.

To measure the efficiency of circularization mediated by SYTE-DNAzRL12, a SYBR Green qPCR was performed after a cDNA synthesis using reverse transcriptase, as seen in FIG. 20. For this, two pairs of primers were used. One of them generates amplification products either from the linear or circular RNA molecule. By contrast, the other pair only amplifies the junction region between the ends of the linear molecule turned into circular.

Figure 21:
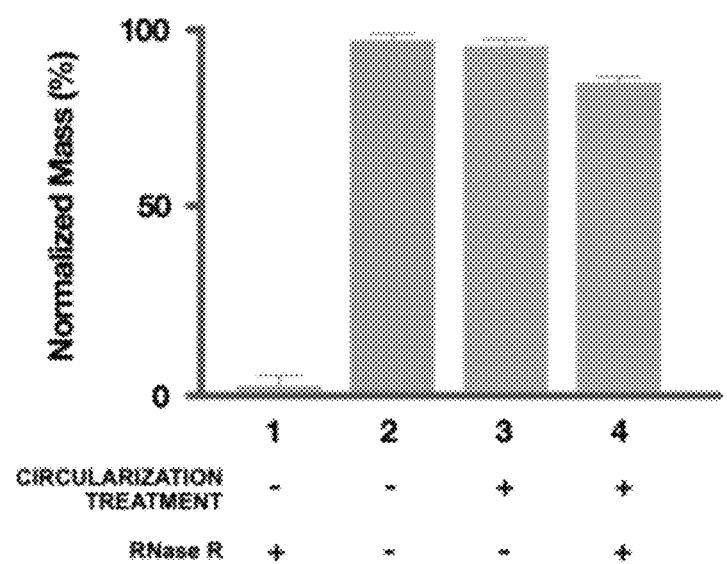
FIG. 21 is a graph representing the Normalized Mass of circRNA molecules measured by fluorometry, quantified using Qubit™ RNA Broad range kit for the DNAzyme mediated RNA ligation method.

Another experiment was carried out to measure RNA mass by fluorometry. For this, RNA samples were quantified using Qubit™ RNA Broad range kit, as depicted in FIG. 21.

Engineered CRISPR/dCas9-Ligase Mediated RNA Circularization pSYTEcRNA1 plasmid was amplified in *E. coli* TOP10 and once purified and quantified it was subjected to PCR reaction to linearize the sequence of interest. An analytical agarose gel electrophoresis was performed to visualize the presence of the amplicon as can be depicted in FIG. 15.

Once linearized and purified, DNA molecules were subjected to an In vitro transcription reaction, where linear RNA molecules were produced, showed in FIG. 16.

Once the linear RNA molecules were correctly generated, they were treated with the CRISPR/dCas9-DNALigase gRNA-HR complex to permit the ligation of RNA ends and thus giving rise to covalently closed circular polyribonucleotides. To confirm circularization, a purification step with performed, and after circRNA purification, a second enzymatic treatment with RNAse R was performed. As can be depicted in FIG. 18 circRNA molecules were not digested by RNAse R enzyme, and the linear RNA molecules used as control were totally degraded when subjected to this enzyme.

Figure 22:
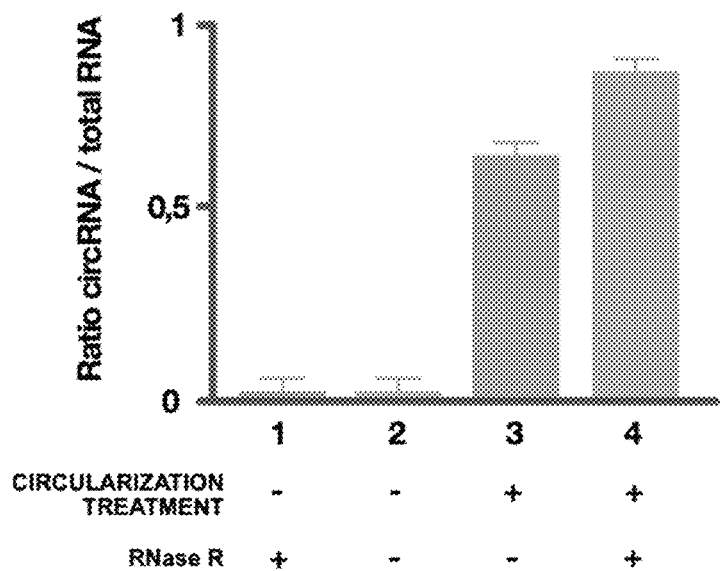
FIG. 22 is a graph representing the Ratio of circRNA/total RNA obtained by qPCR for the CRISPR/dCas9-DNALigase mediated RNA ligation method.

To measure the efficiency of circularization mediated by CRISPR/dCas9-DNALigase method, a SYBR Green qPCR was performed after a cDNA synthesis using reverse transcriptase, as seen in FIG. 22. For this, two pairs of primers were used. One of them can generate an amplification product either from the linear or circular RNA molecule. By contrast, the other pair only amplifies the junction region between the ends of the linear molecule turned into circular.

Figure 23:
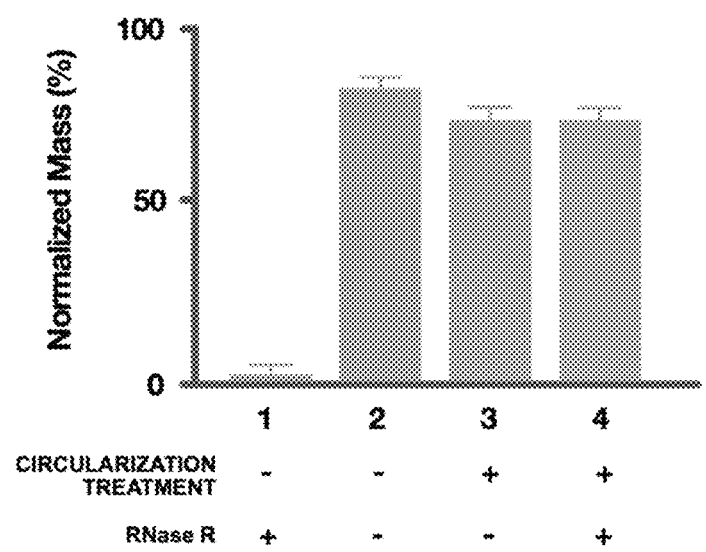
FIG. 23 is a graph representing the Normalized Mass of circRNA molecules measured by fluorometry, quantified using Qubit™ RNA Broad range kit for the DNAzyme mediated RNA ligation method.

Another experiment was carried out to measure RNA mass by fluorometry. For this, RNA samples were quantified using Qubit™ RNA Broad range kit, as depicted in FIG. 23

Self-Complementary Intron-Exon Mediated Ligation (SCI-EML)

pSYTEcRNA2 plasmid was amplified in *E. coli* TOP10 and once purified and quantified it was subjected to PCR reaction to linearize the sequence of interest. An analytical agarose gel electrophoresis was performed to visualize the presence of the linearized amplicon as depicted in FIG. 15.

Once linearized and purified, DNA molecules were subjected to an In vitro transcription reaction, where linear RNA molecules were produced, as shown in FIG. 16.

After in vitro transcription reaction, a suitable buffer was added to permit self-hybridization and ribozyme to self-anneal, Self-Splice, and Self-Ligate, yielding circRNA molecules. After these steps, a treatment with RNAse R was performed and results are shown in FIG. 19

Figure 24:
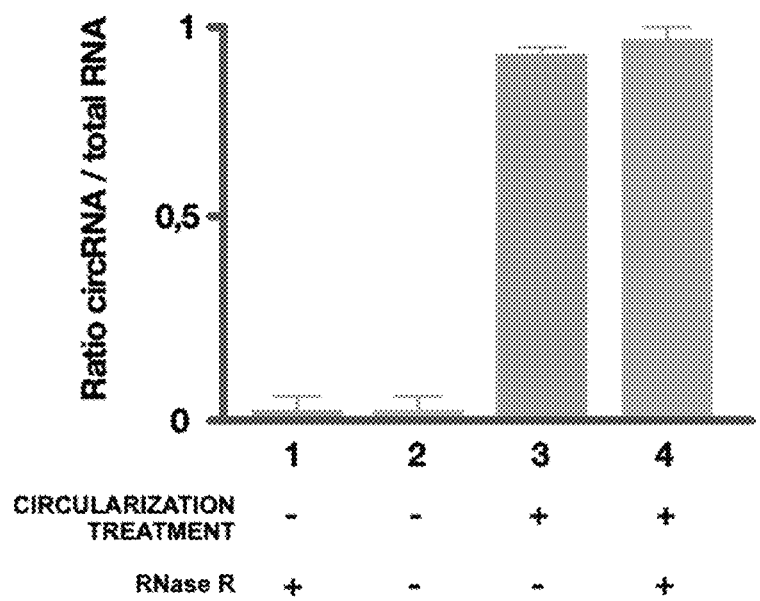
FIG. 24 is a graph representing the Ratio of circRNA/total RNA obtained by qPCR for the Self-Complementary Intron-Exon Mediated Ligation RNA circularization method.

To measure the efficiency of circularization mediated by Self-Complementary Intron-Exon Mediated Ligation method, a SYBR Green qPCR was performed after a cDNA synthesis using reverse transcriptase, as seen in FIG. 24. For this, two pairs of primers were used. One of them can generate amplification products either from the linear or circular RNA molecule. By contrast, the other pair only amplifies the junction region between the ends of the linear molecule turned into circular.

Figure 25:
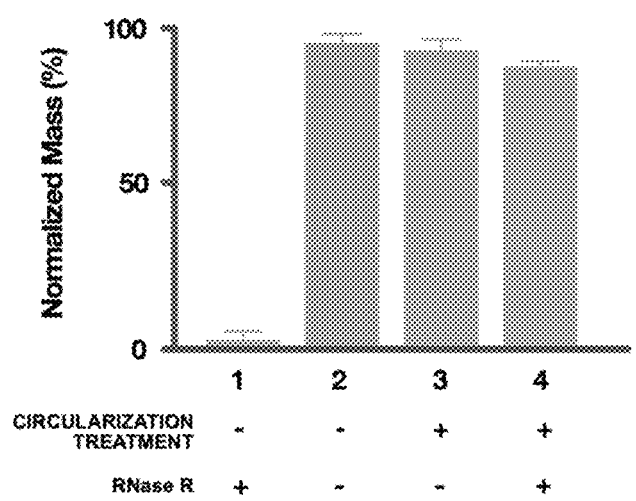
FIG. 25 is a graph representing the Normalized Mass of circRNA molecules measured by fluorometry, quantified using Qubit™ RNA Broad range kit for the Self-Complementary Intron-Exon Mediated Ligation RNA circularization method.
Figure 26:
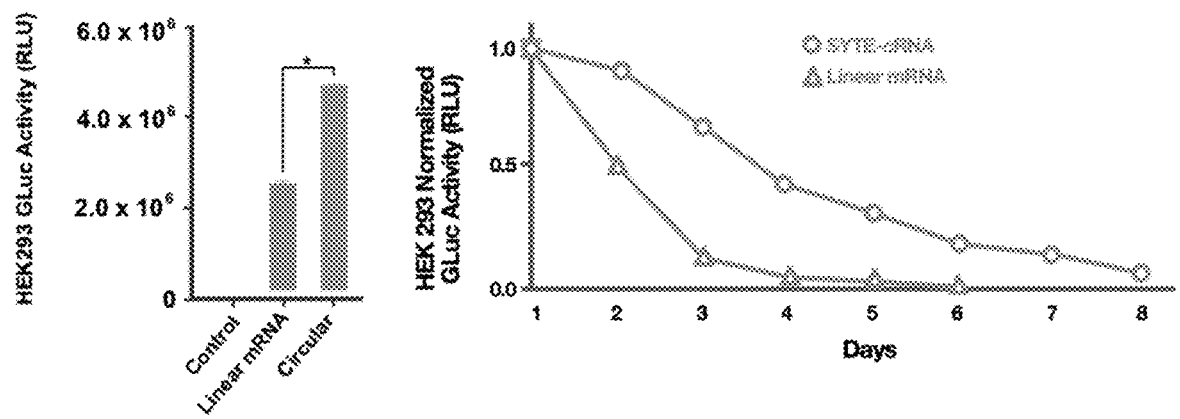
FIG. 26 graphically represents the GLuc activity in a transfection expression assay in non-tumoral HEK 293 cell line where linear unmodified RNA molecules, linear modified RNA molecules, and circRNA molecules generated using non-modified nucleotides and the Self-Complementary Intron-Exon Mediated circularization method were used. Normalized GLuc activity was measured for 144 h (6 days).
Figure 27:
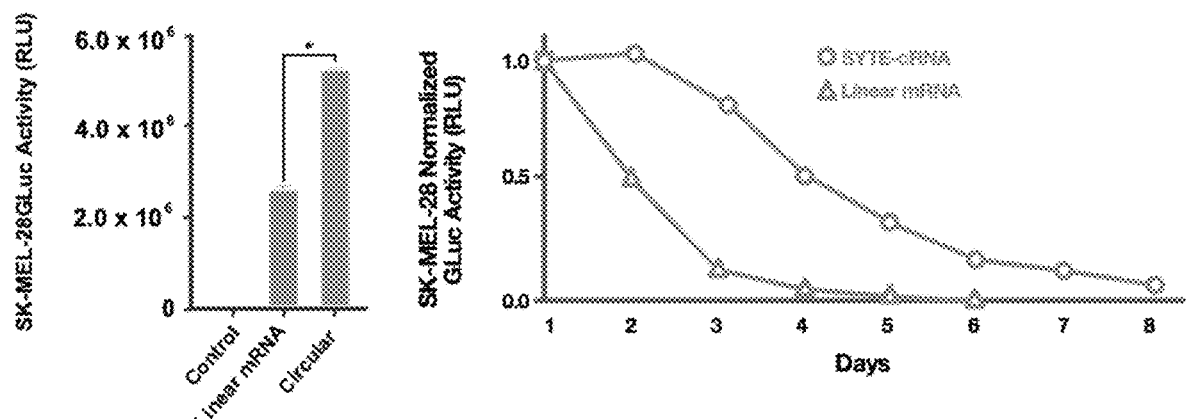
FIG. 27 graphically represents the GLuc activity in a transfection expression assay in a melanoma SK-MEL-28 cell line where linear unmodified RNA molecules, linear modified RNA molecules, and circRNA molecules generated using non-modified nucleotides and the Self-Complementary Intron-Exon Mediated circularization method were used. Normalized GLuc activity was measured for 144 h (6 days).
Figure 28:
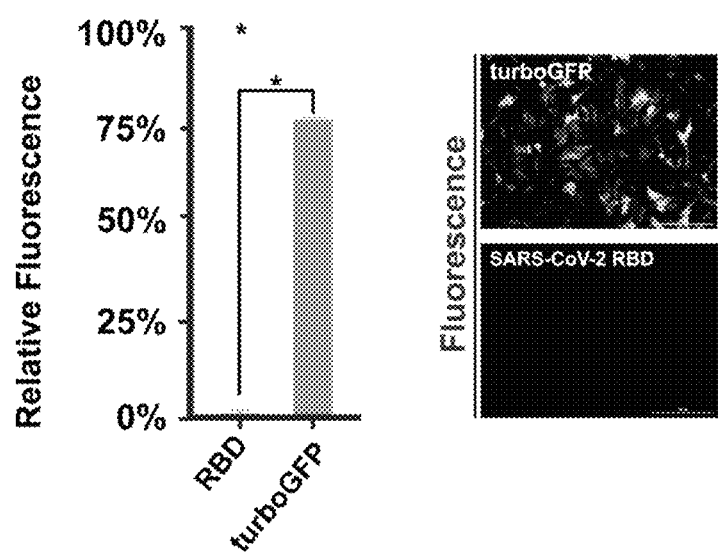
FIG. 28 illustrates a fluorescence microscopy analysis of cells transfected with a circRNA encoding the turboGFP reporter gene and SARS-CoV-2 RBD sequence as a negative control of fluorescence.

Another experiment was carried out to measure RNA mass by fluorometry. For this, RNA samples were quantified using Qubit™ RNA Broad range kit, as depicted in FIG. 25.

Translation Efficiency

In some embodiments, the translation efficiency of a circular polyribonucleotide provided in this invention is greater than a linear counterpart.

To compare translation of circRNA with its linear mRNA counterpart, an expression assay was performed. Briefly, non-tumoral HEK 293 cell line and an melanoma SK-MEL-28 cell line was transfected with linear unmodified RNA molecules, linear modified RNA molecules and circRNA molecules generated using non-modified nucleotides and the Self-Complementary Intron-Exon Mediated Ligation method, all encoding turboGFP (SEQ ID NO 12). Gluc activity (RLU) was measured for 144 h (6 days) and the circRNA molecule was more efficient and could express the reporter protein for twice the time when compared to the linear RNA molecules, thus yielding approximately 2-fold more recombinant protein, as depicted in FIGS. 29 and 30.

Terminology

As used herein, the article "a", "an", and "the'" means "at least one", unless the context in which the article is used clearly indicates otherwise. The term "nucleic acid" as used herein means a polymer composed of nucleotides, e.g., deoxyribonucleotides or ribonucleotides.

The terms "ribonucleic acid", "RNA" and "polyribonucleotide" as used herein mean a polymer composed of ribonucleotides.

The terms "circular polyribonucleotide", "circRNA" and "circular RNA" are used interchangeably throughout this patent.

The terms "deoxyribonucleic acid", "DNA" an "polydeoxyribonucleotide" as used herein mean a polymer composed of deoxyribonucleotides.

The term "circular covalently closed DNA", "circular covalently closed plasmid DNA", "pDNA" and "plasmid DNA" are used interchangeably throughout this patent.

The term "oligonucleotide" denotes single- or double-stranded nucleotide multimers that range from about 2 to up to about 200 nucleotides in length. Suitable oligonucleotides may be prepared by a chemical method such as the phosphoramidite method or an enzymatic method.

The term "polynucleotide" refers to a single- or double-stranded polymer composed of nucleotide monomers.

The term "polypeptide" refers to a compound made up of a single chain of D-configured or L-configured amino acids joined by peptide bonds.

The term "complementary" refers to an interacting surface of a molecule and its target. Thus, the probe and the target can be described as complementary.

The term "hybridization" refers to a process that establishes a non-covalent sequence specific interaction between two or more complementary strands of nucleic acids into a single hybrid, which is referred to as a duplex.

The term "homology arm" is any contiguous sequence that is 1) predicted to form base pairs with at least about 75% (e.g., at least about 80%, at least about 85%, at least about 90%, at least about 95%, about 100%) of another sequence in the RNA, such as another homology arm; 2) at least 7 nt long and no longer than 250 nt; 3) located before and adjacent to, or included within, the 3' intron fragment and/or after and adjacent to, or included within, the 5' intron fragment; and, optionally, 4) predicted to have less than 50% (e.g., less than 45%, less than 40%, less than 35%, less than 30%, less than 25%) base pairing with unintended sequences in the RNA (e.g., non-homology arm sequences). A "strong homology arm" refers to a homology arm with a Tm of greater than 50 degrees Celsius when base paired with another homology arm in the RNA.

The term "anneal" refers to the process by which a single-stranded nucleic sequence pairs by hydrogen bonds to a complementary sequence, thus forming a double-stranded nucleic acid sequence. This includes the reformation of complementary strands that were thermally denatured, known as renaturation.

The term "target" refers to a molecule with an affinity for a given probe. Targets may be natural or man-made molecules.

The term "promoter", "regulatory element" or "regulatory sequence" refers to a region or genetic sequence located upstream or downstream from the start of the transcription site and that are involved in the recognition and binding of RNA polymerase and other proteins to initiate the transcription process. Selected promoters may include, but are not limited to, bacterial promoters, viral promoters, mammalian promoters, yeast promoters or combinations thereof.

The term "regulatory element" is intended to include promoters, enhancers, internal ribosome entry sites (IRES) and other expression control elements such as, but not limited to, transcription termination signals, polyadenylation signals and poly-U sequences. Regulatory elements may include those that direct constitutive expression of a nucleic acid sequence in a wide variety of cell types, tissues, or organs and those that direct expression of a nucleic acid sequence only in certain cell types, tissues, or organs, such as, but not limited to, cell-specific regulatory sequences, tissue-specific regulatory sequences, and organ-specific regulatory sequences.

A cell-specific promoter may direct the expression of a nucleic acid sequence in a desired cell type of interest such as, but not limited to, lymphocytes, muscle cells, keratinocytes, and fibroblasts. A tissue-specific promoter may direct the expression of a nucleic acid sequence in a desired tissue of interest such as, but not limited to, muscle, neuron, bone, skin, and blood. An organ-specific promoter may direct the expression of a nucleic acid sequence in a desired organ such as, but not limited to, liver, brain, heart, lungs, and kidneys.

Regulatory elements may also direct expression in a temporal dependent manner such as, but not limited to, cell cycle and developmental stage.

Also encompassed by the term "regulatory element" are enhancer elements that include, but are not limited to, WPRE enhancer, CMV enhancer, and HTLV-LTR enhancer.

In some embodiments the promoters and regulatory elements may include novel proprietary sequences.

The term "recombinant" refers to a human manipulated nucleic acid, while in reference to a protein ("recombinant protein"), a protein encoded by a recombinant nucleic acid.

In some embodiments, a recombinant transcriptional unit comprises a promoter operably linked to a second nucleic acid sequence that may be an open reading frame that encodes a genetic product. In some embodiments, a recombinant transcriptional unit may comprise nucleic acids combined in such a way that these nucleic acids are extremely unlikely to be found in nature.

The term "transcriptional unit" refers to a nucleic acid construct, which when introduced into a cell, results in transcription and/or translation of an RNA or polypeptide.

In some embodiments, the transcriptional unit comprises a terminator or termination sequence operably linked to the open reading frame.

In some embodiments, the transcriptional unit comprises at least one synthetic or non-natural promoter, at least one synthetic or non-natural coding sequence and at least one synthetic or non-natural terminator.

The term "codon optimized" refers to the alteration of codons in the open reading frame of nucleic acid sequences to reflect the typical codon usage of a selected organism without altering the polypeptide encoded by the sequence. The optimization includes replacing at least one, or more than one, or a significant number of codons with one or more codons that are more frequently used in the genes of that selected organism.

A nucleic acid sequence is "operably linked" when it is placed into a functional relation with another nucleic acid sequence.

As used herein a "host" means an individual, and can include domesticated animals such as, but not limited to, cats and dogs; livestock such as but not limited to, cattle, horses, pigs, sheeps, and goats; laboratory animals such as, but not limited to, mice, rabbits, rats, and guinea pigs; mammalians such as, but not limited to, humans, non-human primates, and primates; other animals such as, but not limited to, rodents, birds, reptiles, amphibians, and fish.

In some embodiments, the terms "guide RNA", "gRNA", "CRISPR RNA" and "crRNA" are used interchangeably throughout the specification.

Sequence Listing

SEQ ID NO 1
LENGTH: 3045
TYPE: DNA
ORGANISM: Artificial
FEATURE: pSYTEcRNA
OTHER INFORMATION: circRNA transcription template plasmid DNA

SEQUENCE: 1

GTCCGTTGTTTATTTTTCTAAATACATTCAAATATGTATCCGCTCATGA

GACAATAACCCTGATAAATGCTTCAATAATATTGAAAAAGGAAGAGTAT

GAGTATTCAACATTTCCGTGTCGCCCTTATTCCCTTTTTTGCGGCATTT

TGCCTTCCTGTTTTTGCTCACCCAGAAACGCTGGTGAAAGTAAAAGATG

CTGAAGATCAGTTGGGTGCACGAGTGGGTTACATCGAACTGGATCTCAA

CAGCGGTAAGATCCTTGAGAGTTTTCGCCCCGAAGAACGTTTCCCAATG

ATGAGCACTTTTAAAGTTCTGCTATGTGGCGCGGTATTATCCCGTGTTG

ACGCCGGGCAAGAGCAACTCGGTCGCCGCATACACTATTCTCAGAATGA

CTTGGTTGAGTACTCACCAGTCACAGAAAAGCATCTTACGGATGGCATG

ACAGTAAGAGAATTATGCAGTGCTGCCATAACCATGAGTGATAACACTG

CGGCCAACTTACTTCTGACAACGATCGGAGGACCGAAGGAGCTAACCGC

TTTTTTGCACAACATGGGGGATCATGTAACTCGCCTTGATCGTTGGGAA

CCGGAGCTGAATGAAGCCATACCAAACGACGAGCGTGACACCACGATGC

-continued
CTGTAGCAATGGCAACAACGTTGCGCAAACTATTAACTGGCGAACTACT

TACTCTAGCTTCCCGGCAACAATTAATAGACTGGATGGAGGCGGATAAA

GTTGCAGGACCACTTCTGCGCTCGGCCCTTCCGGCTGGCTGGTTTATTG

CTGATAAATCTGGAGCCGGTGAGCGTGGGTCTCGCGGTATCATTGCAGC

ACTGGGGCCAGATGGTAAGCCCTCCCGTATCGTAGTTATCTACACGACG

GGGAGTCAGGCAACTATGGATGAACGAAATAGACAGATCGCTGAGATAG

GTGCCTCACTGATTAAGCATTGGTAACTGTCAGACCAAGTTTACTCATA

TATACTTTAGATTGATTTCCTTAGGACTGAGCGTCAACCCCGTAGAAAA

GATCAAAGGATCTTCTTGAGATCCTTTTTTTCTGCGCGTAATCTGCTGC

TTGCAAACAAAAAAACCACCGCTACCAGCGGTGGTTTGTTTGCCGGATC

AAGAGCTACCAACTCTTTTTCCGAAGGTAACTGGCTTCAGCAGAGCGCA

GATACCAAATACTGTCCTTCTAGTGTAGCCGTAGTTAGGCCACCACTTC

AAGAACTCTGTAGCACCGCCTACATACCTCGCTCTGCTAATCCTGTTAC

CAGTGGCTGCTGCCAGTGGCGATAAGTCGTGTCTTACCGGGTTGGACTC

AAGACGATAGTTACCGGATAAGGCGCAGCGGTCGGGCTGAACGGGGGT

TCGTGCACACAGCCCAGCTTGGAGCGAACGACCTACACCGAACTGAGAT

ACCTACAGCGTGAGCTATGAGAAAGCGCCACGCTTCCCGAAGGGAGAAA

GGCGGACAGGTATCCGGTAAGCGGCAGGGTCGGAACAGGAGAGCGCACG

AGGGAGCTTCCAGGGGAAACGCCTGGTATCTTTATAGTCCTGTCGGGT

TTCGCCACCTCTGACTTGAGCGTCGATTTTTGTGATGCTCGTCAGGGG

GCGGAGCCTATGGAAAAACGCCAGCAACGCGGCCTTTTTACGGTTCCTG

GCCTTTTGCTGGCCTTTTGCTCACGAATTAATTCATGAGCGGATACATA

TTTGAATGTATTTAGAAAAATAAACAAATAGGGGTTCCGCGCACATTTC

CCCGAATAATACGACTCACTATAGGNNNNNNNNNNNNNNNNNNNNNNNN

NNNNNNNNNNNNNNNNNAACAACAGATAACTTACAGCTATCGGAAGGTGC

AGAGACTCGACGGGAGCTACCCTAACGTCAAGACGAGGGTAAAGATGAG

AGTCCAATTCTCAAAGCCAATAGGCAGTAGCGAAAGCTGCGGGAGAAGA

AAATCCGTTGACCTTAAACGGTCGTGTGGGTTCAAGTCCCTCCACCCCC

ANNNNNNNNNNNNNNNNNNNNNNNNNNNNNNNNNNNNNNCCCGGGTC

TAGAAAACGCAATAGCGGAAAAACTTTAAACATTAAAACCCCCTCTCC

CTCCCCCCCTAACGTTACTGGCCGAAGCCGCTTGGAATAAGGCCGGTGT

GCGTTTGTCTATATGTTATTTTCCACCATATTGCCGTCTTTTGGCAATG

TGAGGGCCCGGAAACCTGGCCCTGTCTTCTTGACGAGCATTCCTAGGGG

TCTTTCCCCTCTCGCCAAAGGAATGCAAGGTCTGTTGAATGTCGTGAAG

GAAGCAGTTCCTCTGGAAGCTTCTTGAAGACAAACAACGTCTGTAGCGA

CCCTTTGCAGGCAGCGGAACCCCCCACCTGGCGACAGGTGCCTCTGCGG

CCAAAAGCCACGTGTATAAGATACACCTGCAAAGGCGGCACAACCCCAG

TGCCACGTTGTGAGTTGGATAGTTGTGGAAAGAGTCAAATGGCTCTCCT

CAAGCGTATTCAACAAGGGGCTGAAGGATGCCCAGAAGGTACCCCATTG

TATGGGATCTGATCTGGGGCCTCGGTGCACATGCTTTACATGTGTTTAG

TCGAGGTTAAAAAACGTCTAGGCCCCCCGAACCACGGGGACGTGGTTTT

-continued
CCTTTGAAAAACACGATGATAATATGGCCACAACCATGGAGACGCTGTC

CATGGTGAGAGATCTGTAGCTCGAGCTGTAATTTACAAAAAACAAAACG

GCTTAAATGCCTAANNNNNNNNNNNNNNNNNNNNNNNNNNNNNNNNNN

NNNNNTGAAGAGAAAAGCAAGTTCTTGTAAGTTTAACCATAAATTTGCC

AGCCACGGCAAGCTAGACGCTACGGACTTAAATAATTGAGCCTTAGAGA

AGAAATTCTTTAAGTGGATACTCTCAAACTCAGGGAAACCTAAATCTAG

CGATAGACAAGGCAATCCTGAGCCAAGCCGAAGTAGTAATTAGTAAGTT

NNNNNNNNNNNNNNNNNNNNNNNNNNNNNNNNNNNNNNNNNATAACAGCA

TATCTAG

SEQ ID NO 2
LENGTH: 17
TYPE: DNA
ORGANISM: Artificial
FEATURE: HR1A
OTHER INFORMATION: Homology Region 1A
SEQUENCE: 2

GGACAAGATCGCGCGGA

SEQ ID NO 3
LENGTH: 17
TYPE: DNA
ORGANISM: Artificial
FEATURE: HR1B
OTHER INFORMATION: Homology Region 1B
SEQUENCE: 3

AGTGCACGAGTCTCAGG

SEQ ID NO 4
LENGTH: 17
TYPE: DNA
ORGANISM: Artificial
FEATURE: HR2A
OTHER INFORMATION: Homology Region 2A
SEQUENCE: 4

CCTGTTCTAGCGCGCCT

SEQ ID NO 5
LENGTH: 17
TYPE: DNA
ORGANISM: Artificial
FEATURE: HR2B
OTHER INFORMATION: Homology Region 2B
SEQUENCE: 5

TCACGTGCTCAGAGTCC

SEQ ID NO 6
LENGTH: 17
TYPE: DNA
ORGANISM: Artificial
FEATURE: DNAz-HR1/gRNA-HR1
OTHER INFORMATION: DNAzime/guideRNA Homology Region HR1
SEQUENCE: 6

GGACTCTGAGCACGTGA

SEQ ID NO 7
LENGTH: 17
TYPE: DNA
ORGANISM: Artificial
FEATURE: DNAz-HR2/gRNA-HR2
OTHER INFORMATION: DNAzime/guideRNA Homology Region HR2
SEQUENCE: 7

GGACAAGATCGCGCGGA

SEQ ID NO 8
LENGTH: 74
TYPE: DNA
ORGANISM: Artificial
FEATURE: SYTE-DNAzRL12
OTHER INFORMATION: SYTE-DNAzRL12 RNA ligating DNAzyme
SEQUENCE: 8

NNNNNNNNNNNNNNNTCCGCTTGATACCGAGCGTCGGCAATGCCGTGTTG
ATTGATGATCCNNNNNNNNNNNNNNN

SEQ ID NO 9
LENGTH: 67
TYPE: DNA
ORGANISM: Artificial
FEATURE: SYTE-DNAzRL16
OTHER INFORMATION: SYTE-DNAzRL16 RNA ligating DNAzyme
SEQUENCE: 9

NNNNNNNNNNNNNNNGGATGCATACATCGCTGCGCATAGCGCAGTACATA
CAACNNNNNNNNNNNNNNN

SEQ ID NO 10
LENGTH: 261
TYPE: DNA
ORGANISM: Artificial
FEATURE: CircSEQ1
OTHER INFORMATION: pSYTEcRNA circularization sequence 1
SEQUENCE: 10

NNNNNNNNNNNNNNNNNNNNNNNNNNNNNNNNNNNNNNNAACAACAGA
TAACTTACAGCTATCGGAAGGTGCAGAGACTCGACGGGAGCTACCCTAA
CGTCAAGACGAGGGTAAAGATGAGAGTCCAATTCTCAAAGCCAATAGGC
AGTAGCGAAAGCTGCGGGAGAAGAAAATCCGTTGACCTTAAACGGTCGT
GTGGGTTCAAGTCCCTCCACCCCCANNNNNNNNNNNNNNNNNNNNNNN
NNNNNNNNNNNNNNNN

SEQ ID NO 11
LENGTH: 271
TYPE: DNA
ORGANISM: Artificial
FEATURE: CircSEQ2
OTHER INFORMATION: pSYTEcRNA circularization sequence 2
SEQUENCE: 11

NNNNNNNNNNNNNNNNNNNNNNNNNNNNNNNNNNNNNNNNTGAAGAGAA
AAGCAAGTTCTTGTAAGTTTAACCATAAATTTGCCAGCCACGGCAAGCT
AGACGCTACGGACTTAAATAATTGAGCCTTAGAGAAGAAATTCTTTAAG
TGGATACTCTCAAACTCAGGGAAACCTAAATCTAGCGATAGACAAGGCA
ATCCTGAGCCAAGCCGAAGTAGTAATTAGTAAGTTNNNNNNNNNNNNNN
NNNNNNNNNNNNNNNNNNNNNNNNN

SEQ ID NO 12
LENGTH: 1574
TYPE: RNA
ORGANISM: Artificial
FEATURE: circRNA-turboGFP
OTHER INFORMATION: circular polyribonucleotide encoding turboGFP
SEQUENCE: 11

GAAAAUCCGUUGACCUUAAACGGUCGUGUGGGUUCAAGUCCCUCCACCC
CCAAUUAGGAGACUAGAGGACGGUGAGAGUGACCAGAUGAGAUAAACGC
AAUAGCGGAAAAACUUUAAACAUUAAAACCCCCCUCUCCCUCCCCCCCU
AACGUUACUGGCCGAAGCCGCUUGGAAUAAGGCCGGUGUGCGUUUGUCU
AUAUGUUAUUUUCCACCAUAUUGCCGUCUUUUGGCAAUGUGAGGGCCCG
GAAACCUGGCCCUGUCUUCUUGACGAGCAUUCCUAGGGGUCUUUCCCCU
CUCGCCAAAGGAAUGCAAGGUCUGUUGAAUGUCGUGAAGGAAGCAGUUC
CUCUGGAAGCUUCUUGAAGACAAACAACGUCUGUAGCGACCCUUUGCAG
GCAGCGGAACCCCCCACCUGGCGACAGGUGCCUCUGCGGCCAAAAGCCA
CGUGUAUAAGAUACACCUGCAAAGGCGGCACAACCCCAGUGCCACGUUG
UGAGUUGGAUAGUUGUGGAAAGAGUCAAAUGGCUCUCCUCAAGCGUAUU
CAACAAGGGGCUGAAGGAUGCCCAGAAGGUACCCCAUUGUAUGGGAUCU
GAUCUGGGGCCUCGGUGCACAUGCUUUACAUGUGUUUAGUCGAGGUUAA
AAAACGUCUAGGCCCCCCGAACCACGGGGACGUGGUUUUCCUUUGAAAA
ACACGAUGAUAAUAUGGCCACAACCAUGGAGAGCGACGAGAGCGGCCUG
CCCGCCAUGGAGAUCGAGUGCCGCAUCACCGGCACCCUGAACGGCGUGG
AGUUCGAGCUGGUGGGCGGCGGAGAGGGCACCCCCGAGCAGGGCCGCAU
GACCAACAAGAUGAAGAGCACCAAAGGCGCCCUGACCUUCAGCCCCUAC
CUGCUGAGCCACGUGAUGGGCUACGGCUUCUACCACUUCGGCACCUACC
CCAGCGGCUACGAGAACCCCUUCCUGCACGCCAUCAACAACGGCGGCUA
CACCAACACCCGCAUCGAGAAGUACGAGGACGGCGGCGUGCUGCACGUG
AGCUUCAGCUACCGCUACGAGGCCGGCCGCGUGAUCGGCGACUUCAAGG
UGAUGGGCACCGGCUUCCCCGAGGACAGCGUGAUCUUCACCGACAAGAU
CAUCCGCAGCAACGCCACCGUGGAGCACCUGCACCCCAUGGGCGAUAAC
GAUCUGGAUGGCAGCUUCACCCGCACCUUCAGCCUGCGCGACGGCGGCU
ACUACAGCUCCGUGGUGGACAGCCACAUGCACUUCAAGAGCGCCAUCCA
CCCCAGCAUCCUGCAGAACGGGGCCCCAUGUUCGCCUUCCGCCGCGUG
GAGGAGGAUCACAGCAACACCGAGCUGGGCAUCGUGGAGUACCAGCACG
CCUUCAAGACCCCGGAUGCAGAUGCCGGUGAAGAAUAAUCUAGACUCGA

GCUGUAAUUUACAAAAAACAAAACGGCUUAAAUGCCUAAUAUAAUAUAC
GUCUAGACUCCCAAUCUCGGACUCUAAGCCUGAAGAGAAAAGCAAGUUC

UUGUAAGUUUAACCAUAAAUUUGCCAGCCACGGCAAGCUAGACGCUACG
GACUUA

---

What is claimed is:

1. An engineered parental circular covalently closed synthetic plasmid DNA comprising:

a synthetic DNA backbone comprising at least two endonuclease recognition sequences (LRE), at least one bacterial selection system, and at least one bacterial origin of replication, and;

at least one circular RNA module scaffold comprising, in the following order, at least one RNA polymerase promoter, at least a first circularization sequence (circSEQ1), at least one 5' DNA spacer, at least a first multiple restriction enzyme recognition sequence (MCS1), at least one translation initiation sequence, at least a second multiple restriction enzyme recognition sequence (MCS2), at least one coding sequence, at least a third multiple restriction enzyme recognition sequence (MCS3), at least one 3' DNA spacer, and at least a second circularization sequence (circSEQ2);

wherein said circularization sequences comprise homology region sequences complementary to a nucleic acid and/or a protein-based system capable of RNA ligation, said system being selected from the group consisting of an RNA ligating DNAzyme-mediated circularization system, a CRISPR/dCas9-DNA-Ligase-mediated circularization system, or Self-Splicing Intron-Exon Mediated circularization system, and wherein the first circularization sequence (circSEQ1) of the at least two circularization sequences of the at least one circular RNA module scaffold is comprised of at least: a first restriction enzyme recognition sequence (RE1A), a first homology region (HR1B) operably linked to an exon segment (Exon I) and intron segment (Intron I) derived from permuted self-splicing and auto-catalytic group I intron-exon systems, a second restriction enzyme recognition sequence (RE1B), and a second homology region (HR1A); and, the second circularization sequence (circSEQ2) of the at least two circularization sequences of the at least one circular RNA module scaffold is comprised of at least: a first homology region (HR2B) operably linked to a first restriction enzyme recognition sequence (RE2A), an exon segment (Exon II) and intron segment (Intron II) derived from permuted self-splicing and auto-catalytic group I intron-exon systems, a second homology region (HR2A) and a second restriction enzyme recognition sequence (RE2B); the first homology region HR1A of the first circularization sequence circSEQ1 being complementary to the second homology region HR2A of the second circularization sequence circSEQ2; and, the second homology region HR1B of the first circularization sequence circSEQ1 being complementary to the first homology region HR2B of the second circularization sequence circSEQ2.

2. The engineered parental circular covalently closed synthetic plasmid DNA of claim 1, wherein the bacterial selection system comprises a transcriptional unit capable of expressing antibiotic resistance genes inside a bacterium.

3. The engineered parental circular covalently closed synthetic plasmid DNA of claim 2, wherein the antibiotic resistance genes can be selected from the group consisting of ampicillin resistance gene, kanamycin resistance gene, chloramphenicol resistance gene, gentamicin resistance gene, spectinomycin resistance gene, streptomycin resistance gene, carbenicillin resistance gene, bleomycin resistance gene, erythromycin resistance gene, tetracycline resistance gene and polymyxin B resistance gene.

4. The engineered parental circular covalently closed synthetic plasmid DNA of claim 1, wherein the bacterial origin of replication is selected from the group consisting of pMB1 origin, pMB1* derivative origin, pBR322 origin, ColE1 origin, ColE1* derivative origin and F1 origin.

5. The engineered parental circular covalently closed synthetic plasmid DNA of claim 1, wherein the RNA polymerase promoter is viral and is selected from the group consisting of T7 RNA polymerase promoter, SP6 RNA polymerase promoter, T3 RNA polymerase promoter, T6 RNA polymerase promoter, T4 RNA polymerase promoter, and K11 RNA polymerase promoter.

6. A process for manufacturing circular RNA comprising at least the following steps:
 a. transforming the engineered parental circular covalently closed synthetic plasmid DNA according to claim 1 into a suitable bacteria strain, and selecting the recombinant clones by means of the bacterial selection system comprised in said parental plasmid;
 b. subjecting the resulting recombinant bacteria to incubation in growth conditions to allow the replication of the engineered parental circular covalently closed synthetic plasmid DNA in order to generate a suitable mass of molecules;
 c. isolating and purifying the resulting engineered parental circular covalently closed synthetic plasmid DNA molecules;
 d. selecting a suitable RNA ligation system from the group consisting of RNA ligating DNAzymes, CRISPR/dCas9-DNALigase, and Intron-Exon Mediated Ligation;
 e. digesting the purified engineered parental circular covalently closed synthetic plasmid DNA with linearization restriction enzymes (LRE);
 f. purifying the linearized circular RNA module scaffold of the engineered parental circular covalently closed synthetic plasmid DNA;
 g. subjecting the purified linearized circular RNA module scaffold to an in vitro transcription reaction in order to generate linear RNA molecules;
 h. subjecting the linear RNA molecules to the selected RNA ligation system; and,
 i. purifying the resulting circular RNA.

7. The process for manufacturing circular RNA of claim 6, additionally comprising, after step d, the step of trimming the parental circular covalently closed synthetic plasmid DNA in its cirSEQ regions (circSEQ1 and circSEQ2) when the RNA ligation system is selected from the RNA ligating DNAzymes and CRISPR/dCas9/Ligase.

8. The process for manufacturing circular RNA of claim 7, wherein the process for manufacturing circular RNA further comprises the steps of:
 a. digesting the purified engineered parental circular covalently closed synthetic plasmid DNA with the RE1A restriction enzyme and the RE1B restriction enzyme to remove a portion of DNA within the first circSEQ region (circSEQ1) comprising the Exon I, Intron I, and HR1B segments, followed by gel-electrophoresis purification of the circSEQ1-trimmed linearized parental circular covalently closed synthetic plasmid DNA;
 b. relegating the gel-electrophoresis purified circSEQ1-trimmed linearized parental circular covalently closed synthetic plasmid DNA;
 c. transforming the circSEQ1-trimmed parental circular covalently closed synthetic plasmid DNA into a suitable bacteria strain, and selecting the recombinant clones by means of the bacterial selection system comprised in the parental plasmid,
 d. isolating and purifying the resulting circSEQ1-trimmed parental circular covalently closed synthetic plasmid DNA molecules;
 e. digesting the circSEQ1-trimmed parental circular covalently closed synthetic plasmid DNA with RE2A restriction enzyme and the RE2B restriction enzyme to remove a portion of DNA within the second circSEQ region (circSEQ2) comprising the Exon II, Intron II and HR2A segments, followed by gel-electrophoresis purification of the circSEQ1/2-trimmed linearized parental circular covalently closed synthetic plasmid DNA;
 f. relegating the gel-electrophoresis purified circSEQ1/2-trimmed parental circular covalently closed synthetic plasmid DNA molecules;
 g. transforming the circSEQ1/2-trimmed parental circular covalently closed synthetic plasmid DNA into a suitable bacteria strain, and selecting the recombinant clones by means of the bacterial selection system comprised in the parental plasmid; and
 h. isolating and purifying the engineered parental circular covalently closed synthetic plasmid DNA with its circSEQ1/2-trimmed regions.

9. The process for manufacturing circular RNA of claim 8, wherein the selected ligation system is an RNA ligating DNAzyme, the RNA ligating DNAzyme comprising at least the following:
 a first section, being a complementary region that targets the 3' free end of the target RNA to be ligated;
 a second section, being a core, capable of providing a stable spatial structure for RNA to be ligated, wherein said core consists of nucleotides with a synergy within their combination that enables the hybridization of two RNA substrates via Watson-Crick base pairing; and,
 a third section, being a complementary region that targets the 5' free end of the target RNA to be ligated; and,
 wherein the process for manufacturing circular RNA additionally comprises subjecting the linearized RNA molecules to the DNAzyme ligation reaction in a suitable buffer for its circularization.

10. The process for manufacturing circular RNA of claim 8, wherein the selected ligation system is a CRISPR/dCas9-DNALigase system, the CRISPR/dCas9-DNALigase system being a synthetic fusion protein comprising the dCas9 fused to a DNA ligase by a peptidic linker, in complex with a synthetic crRNA homologous to the HR1A and HR2B regions of the respective circSEQ1 and circSEQ2 sequences of the parental plasmid providing targeting for the ligase activity to join the ends and thus circularize the linear RNA molecules; and, wherein the process for manufacturing circular RNA additionally comprises subjecting the linear RNA molecules to the dCas9/DNA Ligase chimera for its circularization.

11. The process for manufacturing circular RNA of claim 6, wherein the selected ligation system is an Intron-Exon Mediated Ligation and the process for manufacturing circular RNA additionally comprises the step of subjecting the linearized RNA to a suitable buffer in order to permit the self-pairing of the homology regions HR1A-HR2A and HR1B-HR2B within the circSEQ1 and circSEQ2 sequences derived from the parental plasmid followed by a spontaneous autocatalytic self-splicing event in order to generate circular RNA molecules.

* * * * *

SEQUENCE LISTING

```
Sequence total quantity: 12
SEQ ID NO: 1            moltype = DNA  length = 3045
FEATURE                 Location/Qualifiers
source                  1..3045
                        mol_type = other DNA
                        organism = synthetic construct
misc_feature            1..3045
                        function = circRNA transcription template plasmid DNA
SEQUENCE: 1
gtccgttgtt tattttctca aatacattca aatatgtatc cgctcatgag acaataaccc   60
tgataaatgc ttcaataata ttgaaaaagg aagagtatga gtattcaaca tttccgtgtc  120
gcccttattc ccttttttgc ggcattttgc cttcctgttt ttgctcaccc agaaacgctg  180
gtgaaagtaa aagatgctga agatcagttg ggtgcacgag tgggttacat cgaactggat  240
ctcaacagcg gtaagatcct tgagagtttt cgccccgaag aacgttttcc aatgatgagc  300
acttttaaag ttctgctatg tggcgcggta ttatcccgtg ttgacgccgg gcaagagcaa  360
ctcggtcgcc gcatacacta ttctcagaat gacttggttg agtactcacc agtcacagaa  420
aagcatctta cggatggcat gacagtaaga gaattatgca gtgctgccat aaccatgagt  480
gataacactg cggccaactt acttctgaca acgatcggag gaccgaagga gctaaccgct  540
ttttttgcaca acatggggga tcatgtaact cgccttgatc gttgggaacc ggagctgaat  600
gaagccatac caaacgacga gcgtgacacc acgatgcctg tagcaatggc aacaacgttg  660
cgcaaactat taactggcga actacttact ctagcttccc ggcaacaatt aatagactgg  720
atggaggcgg ataaagttgc aggaccactt ctgcgctcgg cccttccggc tggctggttt  780
attgctgata aatctggagc cggtgagcgt gggtctcgcg gtatcattgc agcactgggg  840
ccagatggta agccctcccg tatcgtagtt atctacacga cggggagtca ggcaactatg  900
gatgaacgaa atagacagat cgctgagata ggtgcctcac tgattaagca ttggtaactg  960
tcagaccaag tttactcata tatactttag attgatttcc ttaggactga gcgtcaaccc 1020
cgtagaaaag atcaaaggat cttcttgaga tcctttttttt ctgcgcgtaa tctgctgctt 1080
gcaaacaaaa aaaccaccgc taccagcggt ggtttgtttg ccggatcaag agctaccaac 1140
tcttttttccg aaggtaactg gcttcagcag agcgcagata ccaaatactg tccttctagt 1200
gtagccgtag ttaggccacc acttcaagaa ctctgtagca ccgcctacat acctcgctct 1260
gctaatcctg ttaccagtgg ctgctgccag tggcgataag tcgtgtctta ccgggttgga 1320
ctcaagacga tagttaccgg ataaggcgca gcggtcgggc tgaacggggg gttcgtgcac 1380
acagcccagc ttggagcgaa cgacctacac cgaactgaga tacctacagc gtgagctatg 1440
agaaagcgcc acgcttcccg aagggagaaa ggcggacagg tatccggtaa gcggcagggt 1500
cggaacagga gagcgcacga gggagcttcc agggggaaac gcctggtatc tttatagtcc 1560
tgtcgggttt cgccacctct gacttgagcg tcgatttttt tgatgctcgt caggggggcg 1620
gagcctatgg aaaaacgcca gcaacgcggc cttttttacgg ttcctggcct tttgctggcc 1680
ttttgctcac gaattaattc atgagcggat acatatttga atgtatttag aaaaataaac 1740
aaatagggggt tccgcgcaca tttccccgaa taatacgact cactataggn nnnnnnnnn 1800
nnnnnnnnnn nnnnnnnnnn nnnnnnnna acaacagata acttacagct atcggaaggt 1860
gcagagactc gacgggagct acccctaacgt caagacgagg gtaaagatga gagtccaatt 1920
ctcaaagcca ataggcagta gcgaaagctg cgggagaaga aaatccgttg accttaaacg 1980
gtcgtgtggg ttcaagtccc tccaccccca nnnnnnnnnn nnnnnnnnnn nnnnnnnnnn 2040
nnnnnnnnnn cccgggtcta gaaaacgcaa tagcggaaaa actttaaaca ttaaaacccc 2100
cctctcccctc cccccctaac gttactggcc gaagccgctt ggaataaggc cggtgtgcgt 2160
ttgtctatat gttattttcc accatattgc cgtcttttgg caatgtgagg gcccggaaac 2220
ctggccctgt cttcttgacg agcattccta ggggtctttc ccctctcgcc aaaggaatgc 2280
aaggtctgtt gaatgtcgtg aaggaagcag ttcctctgga agcttcttga agacaaacaa 2340
cgtctgtagc gaccctttgc aggcagcgga accccccacc tggcgacagg tgcctctgcg 2400
gccaaaagcc acgtgtataa gatacacctg caaaggcggc acaacccccag tgccacgttg 2460
tgagttggat agttgtggaa agagtcaaat ggctctcctc aagcgtattc aacaagggggc 2520
tgaaggatgc ccagaaggta ccccattgta tgggatctga tctggggcct cggtgcacat 2580
gctttacatg tgtttagtcg aggttaaaaa acgtctaggc cccccgaacc acggggacgt 2640
ggttttcctt tgaaaaacac gatgataata tggccacaac catggagacg ctgtccatgg 2700
tgagagatct gtagctcgag ctgtaattta caaaaaacaa aacgccttaa atgcctaann 2760
nnnnnnnnnn nnnnnnnnnn nnnnnnnnnn nnnnnnntg aagagaaaag caagttcttg 2820
taagtttaac cataaatttg ccagccacgg caagctagac gctacggact aaataattg 2880
agccttagag aagaaattct ttaagtggat actctcaaac tcagggaaac ctaaatctag 2940
cgatagacaa ggcaatcctg agccaagccg aagtagtaat tagtaagttn nnnnnnnnn 3000
nnnnnnnnnn nnnnnnnnnn nnnnnnnna taacagcata tctag             3045

SEQ ID NO: 2            moltype = DNA  length = 17
FEATURE                 Location/Qualifiers
source                  1..17
                        mol_type = other DNA
                        organism = synthetic construct
SEQUENCE: 2
ggacaagatc gcgcgga                                                  17

SEQ ID NO: 3            moltype = DNA  length = 17
```

| FEATURE | Location/Qualifiers |
|---|---|
| source | 1..17<br>mol_type = other DNA<br>organism = synthetic construct |

SEQUENCE: 3
agtgcacgag tctcagg                                                  17

| SEQ ID NO: 4 | moltype = DNA   length = 17 |
|---|---|
| FEATURE | Location/Qualifiers |
| source | 1..17<br>mol_type = other DNA<br>organism = synthetic construct |

SEQUENCE: 4
cctgttctag cgcgcct                                                  17

| SEQ ID NO: 5 | moltype = DNA   length = 17 |
|---|---|
| FEATURE | Location/Qualifiers |
| source | 1..17<br>mol_type = other DNA<br>organism = synthetic construct |

SEQUENCE: 5
tcacgtgctc agagtcc                                                  17

| SEQ ID NO: 6 | moltype = DNA   length = 17 |
|---|---|
| FEATURE | Location/Qualifiers |
| source | 1..17<br>mol_type = other DNA<br>organism = synthetic construct |

SEQUENCE: 6
ggactctgag cacgtga                                                  17

| SEQ ID NO: 7 | moltype = DNA   length = 17 |
|---|---|
| FEATURE | Location/Qualifiers |
| source | 1..17<br>mol_type = other DNA<br>organism = synthetic construct |

SEQUENCE: 7
ggacaagatc gcgcgga                                                  17

| SEQ ID NO: 8 | moltype = DNA   length = 74 |
|---|---|
| FEATURE | Location/Qualifiers |
| source | 1..74<br>mol_type = other DNA<br>organism = synthetic construct |
| misc_feature | 1..74<br>function = SYTE-DNAzRL12 deoxyribozyme |

SEQUENCE: 8
nnnnnnnnnn nnnntccgct tgataccgag cgtcggcaat gccgtgttga ttgatgatcc   60
nnnnnnnnnn nnnn                                                    74

| SEQ ID NO: 9 | moltype = DNA   length = 67 |
|---|---|
| FEATURE | Location/Qualifiers |
| source | 1..67<br>mol_type = other DNA<br>organism = synthetic construct |
| misc_feature | 1..67<br>function = SYTE-DNAzRL16 deoxyribozyme |

SEQUENCE: 9
nnnnnnnnnn nnnnggatgc atacatcgct gcgcatagcg cagtacatac aacnnnnnnn   60
nnnnnnn                                                            67

| SEQ ID NO: 10 | moltype = DNA   length = 261 |
|---|---|
| FEATURE | Location/Qualifiers |
| source | 1..261<br>mol_type = other DNA<br>organism = synthetic construct |
| misc_feature | 1..261<br>function = pSYTEcRNA circularization sequence 1 |

SEQUENCE: 10
nnnnnnnnnn nnnnnnnnnn nnnnnnnnnn nnnnnnnnnn aacaacagat aacttacagc   60
tatcggaagg tgcagagact cgacgggagc taccctaacg tcaagacgag ggtaaagatg  120
agagtccaat tctcaaagcc aataggcagt agcgaaagct gcgggagaag aaaatccgtt  180
gaccttaaac ggtcgtgtgg ggtcaagtcc ctccaccccc annnnnnnnn nnnnnnnnnn  240
nnnnnnnnnn nnnnnnnnnn n                                           261

| SEQ ID NO: 11 | moltype = DNA   length = 271 |
|---|---|
| FEATURE | Location/Qualifiers |
| source | 1..271<br>mol_type = other DNA |

```
                        organism = synthetic construct
misc_feature            1..271
                        function = pSYTEcRNA circularization sequence 2
SEQUENCE: 11
nnnnnnnnnn nnnnnnnnnn nnnnnnnnnn nnnnnnnnnn tgaagagaaa agcaagttct    60
tgtaagttta accataaatt tgccagccac ggcaagctag acgctacgga cttaaataat   120
tgagccttag agaagaaatt ctttaagtgg atactctcaa actcagggaa acctaaatct   180
agcgatagac aaggcaatcc tgagccaagc cgaagtagta attagtaagt tnnnnnnnnn   240
nnnnnnnnnn nnnnnnnnnn nnnnnnnnnn n                                  271

SEQ ID NO: 12           moltype = RNA   length = 1574
FEATURE                 Location/Qualifiers
source                  1..1574
                        mol_type = other RNA
                        organism = synthetic construct
misc_feature            1..1574
                        function = circular polyribonucleotide encoding turboGFP
SEQUENCE: 12
gaaaatccgt tgaccttaaa cggtcgtgtg ggttcaagtc cctccacccc caattaggag    60
actagaggac ggtgagagtg accagatgag ataaacgcaa tagcggaaaa actttaaaca   120
ttaaaacccc cctctccctc cccccctaac gttactggcc gaagccgctt ggaataaggc   180
cggtgtgcgt ttgtctatat gttatttcc accatattgc cgtcttttgg caatgtgagg    240
gcccggaaac ctggccctgt cttcttgacg agcattccta ggggtctttc ccctctcgcc   300
aaaggaatgc aaggtctgtt gaatgtcgtg aaggaagcag ttcctctgga agcttcttga   360
agacaaacaa cgtctgtagc gacccttgc aggcagcgga accccccacc tggcgacagg    420
tgcctctgcg gccaaaagcc acgtgtataa gatacacctg caaaggcggc acaaccccag   480
tgccacgttg tgagttggat agttgtggaa agagtcaaat ggctctcctc aagcgtattc   540
aacaagggc tgaaggatgc ccagaaggta ccccattgta tgggatctga tctgggggcct  600
cggtgcacat gctttacatg tgtttagtcg aggttaaaaa acgtctaggc cccccgaacc   660
acggggacgt ggttttcctt tgaaaaacac gatgataata tggccacaac catggagagc   720
gacgagagcg gcctgcccgc catggagatc gagtgccgca tcaccggcac cctgaacggc   780
gtggagttcg agctggtggg cggcggagag ggcaccccg agcagggccg catgaccaac    840
aagatgaaga gcaccaaagg cgccctgacc ttcagcccct acctgctgag ccacgtgatg   900
ggctacggct tctaccactt cggcacctac cccagcggct acgagaaccc cttcctgcac   960
gccatcaaca acggcggcta caccaacacc cgcatcgaga agtacgagga cggcggcgtg  1020
ctgcacgtga gcttcagcta ccgctacgag gccggccgcg tgatcggcga cttcaaggtg  1080
atgggcaccg gcttccccga ggacagcgtg atcttcaccg acaagatcat ccgcagcaac  1140
gccaccgtgg agcacctgca ccccatgggc gataacgatc tggatggcag cttcacccgc  1200
accttcagcc tgcgcgacgg cggctactac agctccgtgg tggacagcca catgcacttc  1260
aagagcgcca tccacccag catcctgcag aacgggggcc ccatgttcgc cttccgccgc   1320
gtggaggagg atcacagcaa caccgagctg ggcatcgtgg agtaccagca cgccttcaag  1380
accccggatg cagatgccgg tgaagaataa tctagactcg agctgtaatt tacaaaaaac  1440
aaaacggctt aaatgcctaa tataatatac gtctagactc ccaatctcgg actctaagcc  1500
tgaagagaaa agcaagttct tgtaagttta accataaatt tgccagccac ggcaagctag  1560
acgctacgga ctta                                                    1574
```